US011887619B2

(12) United States Patent
Yang et al.

(10) Patent No.: US 11,887,619 B2
(45) Date of Patent: Jan. 30, 2024

(54) METHOD AND APPARATUS FOR DETECTING SIMILARITY BETWEEN MULTIMEDIA INFORMATION, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Yurong Yang, Shenzhen (CN); Xuyuan Xu, Hongkong (CN); Guoping Gong, Shenzhen (CN); Yang Fang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/962,722

(22) Filed: Oct. 10, 2022

(65) Prior Publication Data

US 2023/0031846 A1 Feb. 2, 2023

Related U.S. Application Data

(63) Continuation of application No. PCT/CN2021/107117, filed on Jul. 19, 2021.

(30) Foreign Application Priority Data

Sep. 11, 2020 (CN) .......................... 202010956391.X

(51) Int. Cl.
*G10L 25/18* (2013.01)
*G10L 21/0308* (2013.01)

(52) U.S. Cl.
CPC .......... *G10L 25/18* (2013.01); *G10L 21/0308* (2013.01)

(58) Field of Classification Search
None
See application file for complete search history.

(56) References Cited

U.S. PATENT DOCUMENTS 6,928,233 B1 8/2005 Walker et al.
9,299,364 B1 * 3/2016 Pereira .................... G06F 3/165
(Continued)

FOREIGN PATENT DOCUMENTS

CN 104091598 A 10/2014
CN 106126617 A 11/2016
(Continued)

OTHER PUBLICATIONS

The World Intellectual Property Organization (WIPO) International Search Report for PCT/CN2021/107117 Sep. 28, 2021 7 Pages (including translation).

*Primary Examiner* — Douglas Godbold
(74) *Attorney, Agent, or Firm* — ANOVALAW GROUP PLLC

(57) ABSTRACT

A multimedia information processing method includes: parsing multimedia information to separate an audio from the multimedia information; converting the audio to obtain a mel spectrogram corresponding to the audio; determining, according to the mel spectrogram corresponding to the audio, an audio feature vector corresponding to the audio; and determining, based on an audio feature vector corresponding to a source audio in source multimedia information and an audio feature vector corresponding to a target audio in target multimedia information, a similarity between the target multimedia information and the source multimedia information.

18 Claims, 12 Drawing Sheets

(56) References Cited

U.S. PATENT DOCUMENTS

| | | | |
|---|---|---|---|
| 9,491,522 B1* | 11/2016 | Trollope | H04N 21/436 |
| 9,788,777 B1* | 10/2017 | Knight | G06Q 30/0269 |
| 11,038,884 B2* | 6/2021 | Li | H04L 63/0876 |
| 2009/0055650 A1* | 2/2009 | Nakano | G11B 20/00086 |
| | | | 713/176 |
| 2009/0319513 A1 | 12/2009 | Terao et al. | |
| 2014/0161263 A1* | 6/2014 | Koishida | G10L 19/018 |
| | | | 381/56 |
| 2014/0172429 A1* | 6/2014 | Butcher | G10L 19/018 |
| | | | 704/270 |
| 2014/0188487 A1* | 7/2014 | Perez Gonzalez | G10L 19/00 |
| | | | 704/500 |
| 2014/0343933 A1 | 11/2014 | Zhao et al. | |
| 2016/0154880 A1* | 6/2016 | Hoarty | G06F 16/7834 |
| | | | 707/770 |
| 2017/0097992 A1* | 4/2017 | Vouin | G06F 16/686 |
| 2018/0018394 A1* | 1/2018 | Han | G06V 20/46 |
| 2019/0080177 A1* | 3/2019 | Xu | G06F 16/735 |
| 2019/0379545 A1* | 12/2019 | Wong | H04L 9/3236 |
| 2019/0386969 A1* | 12/2019 | Verzun | G06F 21/606 |
| 2020/0012765 A1* | 1/2020 | Smaiely | H04L 9/0637 |
| 2020/0104319 A1* | 4/2020 | Jati | G10L 25/30 |
| 2020/0193064 A1* | 6/2020 | Liu | G06N 3/045 |
| 2020/0273483 A1* | 8/2020 | Li | G10L 25/18 |
| 2020/0275167 A1* | 8/2020 | Ikezoye | H04N 21/2541 |
| 2021/0056980 A1* | 2/2021 | Gfeller | G10L 19/035 |
| 2021/0182433 A1* | 6/2021 | Yan | G06F 21/64 |
| 2021/0357451 A1* | 11/2021 | Wold | G10H 1/0008 |
| 2022/0156863 A1* | 5/2022 | Shimizu | G06Q 50/18 |

FOREIGN PATENT DOCUMENTS

| | | |
|---|---|---|
| CN | 108520078 A | 9/2018 |
| CN | 109002529 A | 12/2018 |
| CN | 110047510 A | 7/2019 |
| CN | 10991391 A | 4/2020 |
| CN | 111581437 A | 8/2020 |
| CN | 112104892 A | 12/2020 |

* cited by examiner

METHOD AND APPARATUS FOR DETECTING SIMILARITY BETWEEN MULTIMEDIA INFORMATION, ELECTRONIC DEVICE, AND STORAGE MEDIUM

RELATED APPLICATION(S)

This application is a continuation application of PCT Patent Application No. PCT/CN2021/107117 filed on Jul. 19, 2021, which claims priority to Chinese Patent Application No. 202010956391.X filed with the National Intellectual Property Administration, PRC on Sep. 11, 2020, all of which are incorporated herein by reference in entirety.

FIELD OF THE TECHNOLOGY

The present disclosure relates to multimedia information processing technologies, and in particular, to a multimedia information processing method and apparatus, an electronic device, and a storage medium.

BACKGROUND

Multimedia information is in various forms, greater demand is seen for multimedia information, and a quantity and types of multimedia information are also increasing.

Taking videos as an example, with the popularization and development of video editing tools, types of video image attacks have become more complex, and it may be difficult to identify similar videos through excessive video cropping. In a cropped video of this type, it may be difficult to identify, simply by relying on video image fingerprints, some video repeating and infringing content that have changed a lot on a screen, resulting in low similarity identification accuracy.

SUMMARY

Technical solutions in the embodiments of the present disclosure are implemented as follows:

In one aspect, the present disclosure provide a multimedia information processing method, performed by an electronic device, the method including: parsing multimedia information to separate an audio from the multimedia information; converting the audio to obtain a mel spectrogram corresponding to the audio; determining, according to the mel spectrogram corresponding to the audio, an audio feature vector corresponding to the audio; and determining, based on an audio feature vector corresponding to a source audio in source multimedia information and an audio feature vector corresponding to a target audio in target multimedia information, a similarity between the target multimedia information and the source multimedia information.

In another aspect, the present disclosure provides a multimedia information processing apparatus, including: a memory storing computer program instructions; and a processor coupled to the memory and configured to execute the computer program instructions and perform: parsing multimedia information to separate an audio from the multimedia information; converting the audio to obtain a mel spectrogram corresponding to the audio; determining, according to the mel spectrogram corresponding to the audio, an audio feature vector corresponding to the audio; and determining, based on an audio feature vector corresponding to a source audio in source multimedia information and an audio feature vector corresponding to a target audio in target multimedia information, a similarity between the target multimedia information and the source multimedia information.

In yet another aspect, the present disclosure provides a non-transitory computer-readable storage medium storing computer program instructions executable by at least one processor to perform: parsing multimedia information to separate an audio from the multimedia information; converting the audio to obtain a mel spectrogram corresponding to the audio; determining, according to the mel spectrogram corresponding to the audio, an audio feature vector corresponding to the audio; and determining, based on an audio feature vector corresponding to a source audio in source multimedia information and an audio feature vector corresponding to a target audio in target multimedia information, a similarity between the target multimedia information and the source multimedia information.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
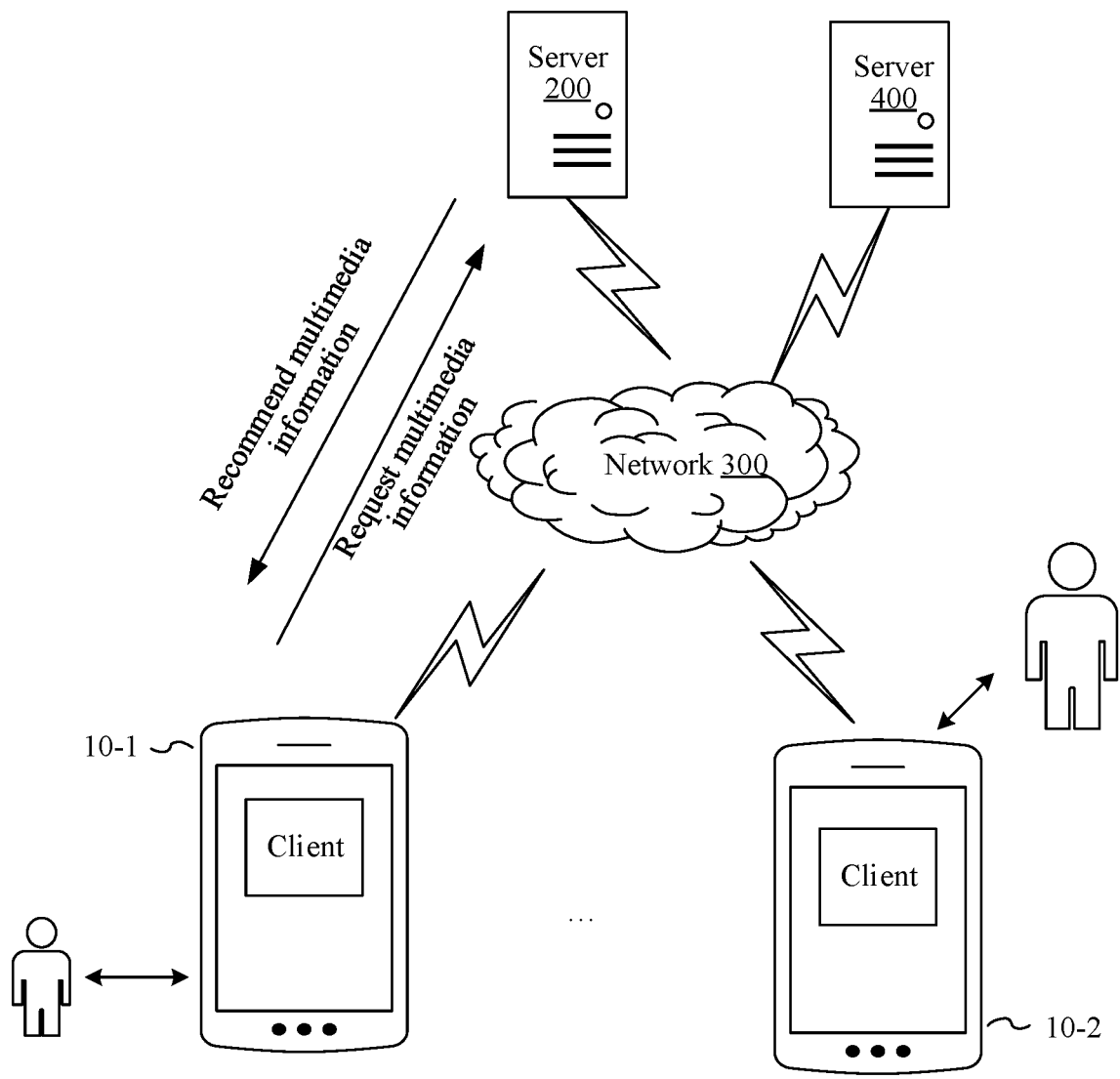
FIG. 1 is a schematic diagram of a use environment of a multimedia information processing method according to certain embodiment(s) of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

Before the embodiments of the present disclosure are further described in detail, a description is made on nouns and terms in the embodiments of the present disclosure, and the nouns and terms in the embodiments of the present disclosure are applicable to the following explanations.

1) "In response to" is used for representing a condition or status on which one or more operations to be performed depend. When or in response to determining that the condition or status is satisfied, the one or more operations may be performed immediately or after a set delay. Unless explicitly stated, there is no limitation on the order in which the plurality of operations are performed.

2) Multimedia information generally refers to multimedia information in various forms available on the Internet. The multimedia information may include at least one of texts, sounds, and images, but is not limited thereto. For example, the multimedia information may be a long video (such as a video with a duration greater than or equal to 1 minute uploaded by a user), a short video (such as a video with a duration less than 1 minute uploaded by a user), or may be an audio, such as a music video (MV) with a fixed image or an album.

3) Client is a carrier implementing specific functions in a terminal, for example, a mobile client (APP) is a carrier implementing specific functions in a mobile terminal, such as executing a function of performing online live broadcast (video streaming) or a function of playing an online video.

4) Short-time Fourier transform (STFT) is a mathematical transform related to Fourier transform, and is used for determining a frequency and a phase of a sine wave in a partial region of a time-varying signal.

5) Mel Bank Features (MBF): Because a spectrogram obtained by audio processing (such as STFT processing) is relatively large, to obtain sound features of an appropriate size, the spectrogram may pass through Mel-scale filter banks, to transform the spectrogram into Mel Bank Features. The spectrogram is obtained by stacking spectrograms over time.

6) Information flow is an organized form of content arranged up and down according to specific desirables and styles. From the perspective of display sorting, time sorting, popularity sorting, or algorithm sorting may be applied.

7) Audio feature vector is an audio $01$ vector, which is a binarized feature vector generated based on an audio.

FIG. 1 is a schematic diagram of a use environment of a multimedia information processing method according to an embodiment of the present disclosure. Referring to FIG. 1, a client capable of performing different functions is arranged on a terminal (such as terminal 10-1 and terminal 10-2). The terminal (such as terminal 10-1 and terminal 10-2) may obtain different multimedia information for browsing from a corresponding server 200 through a network 300 by using a service process in the client. The network 300 may be a wide area network or a local area network, or a combination of the two, which uses a wireless link to implement data transmission. Types of multimedia information obtained by the terminal (such as terminal 10-1 and terminal 10-2) from the corresponding server 200 through the network 300 are not limited, for example, including but not limited to: a long video (such as a video with a duration greater than or equal to 1 minute uploaded by a user, or an existing video which is to undergo copyright verification by the user), a short video (such as a video with a duration less than 1 minute uploaded by a user), and an audio (such as an MV with a fixed image or an album). For example: The terminal (such as terminal 10-1 and terminal 10-2) may either obtain a long video (that is, a video carry video information or a corresponding video link) from the corresponding server 200 through the network 300, or may obtain a short video from a corresponding server 400 for browsing through the same video client or a WeChat mini program by using the network 300. Multimedia information of different types may be stored in the server 200 and the server 400. Playing environments of multimedia information of different types are not differentiated in the present disclosure. Multimedia information pushed to a client of the user during this process is to be copyright-compliant multimedia information. Therefore, for a large quantity of multimedia information, it is desirable to determine which multimedia information is similar, and further perform compliance detection on copyright information of similar multimedia information, so as to avoid pushing duplicate or infringing multimedia information.

Taking short videos as an example, the embodiments of the present disclosure may be applied to short video playing. In short video playing, different short videos from different data sources are usually processed, and finally to-be-recommended videos corresponding to corresponding user are presented on a user interface (UI). If the recommended videos are pirated videos with non-compliant copyrights, there may be a negative impact on the user experience. A background database used for video playing receives a large amount of video data from different sources every day, and the obtained different videos for multimedia information recommendation to target users may also be called by other applications (for example, a recommendation result of a short video recommendation process is migrated to a long video recommendation process or a news recommendation process). In certain embodiment(s), a multimedia information processing model matching a corresponding target user may also be migrated to different multimedia information recommendation processes (for example, a multimedia information recommendation process of a webpage, a multimedia information recommendation process of a mini program, or a multimedia information recommendation process of a long video client).

In some embodiments, the multimedia information processing method provided in the embodiments of the present disclosure may be implemented by a terminal. For example, a terminal (such as terminal 10-1 and terminal 10-2) may locally implement the multimedia information processing solutions.

In some embodiments, the multimedia information processing method provided in the embodiments of the present disclosure may be implemented by a server. For example, a server 200 may implement the multimedia information processing solutions.

In some embodiments, the multimedia information processing method provided in the embodiments of the present disclosure may be collaboratively implemented by a terminal and a server. For example, the terminal (such as terminal 10-1 and terminal 10-2) may transmit a request to the server 200 to request the server 200 to implement the multimedia information processing solutions. The server 200 may transmit the finally obtained to-be-recommended multimedia information to the terminal, so as to perform multimedia information recommendation.

Figure 2:
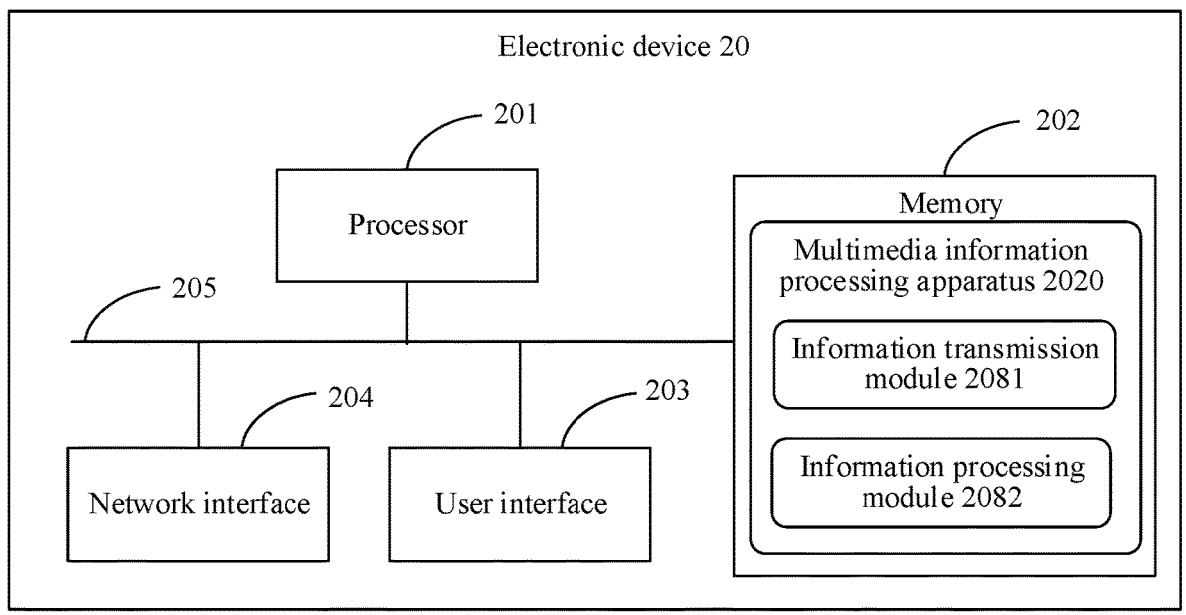
FIG. 2 is a schematic structural diagram of composition of an electronic device according to certain embodiment(s) of the present disclosure.

The structure of an electronic device according to the embodiments of the present disclosure is described in detail below. The electronic device may be implemented in various forms, for example, a terminal with a multimedia information processing function, such as a mobile phone running a video client, where the trained multimedia information processing model may be encapsulated in a storage medium of the terminal, or may be a server or a server group with a multimedia information processing function, where the trained multimedia information processing model may be deployed in a server, such as the server 200 in FIG. 1 described above. FIG. 2 is a schematic structural diagram of composition of an electronic device according to an embodiment of the present disclosure. It may be understood that, FIG. 2 shows only an exemplary structure rather than a complete structure of the electronic device. The structure shown in FIG. 2 may be partially or entirely implemented according to desirables.

The electronic device provided in the embodiments of the present disclosure may include: at least one processor 201, a memory 202, a user interface 203, and at least one network interface 204. All the components in the electronic device 20 are coupled together by using a bus system 205. It may be understood that the bus system 205 is configured to implement connection and communication between the components. In addition to a data bus, the bus system 205 further includes a power bus, a control bus, and a status signal bus. However, for ease of clear description, all types of buses are marked as the bus system 205 in FIG. 2.

The user interface 203 may include a display, a keyboard, a mouse, a track ball, a click wheel, a key, a button, a touch panel, a touchscreen, or the like.

It may be understood that, the memory 202 may be a volatile memory or a non-volatile memory, or may include both a volatile memory and a non-volatile memory. The memory 202 in the embodiments of the present disclosure can store data to support operations of the terminal (for example, terminal 10-1 or terminal 10-2). An example of the data includes: any computer program, for example, an operating system and an application, configured to be operated on the terminal (for example, terminal 10-1 and terminal 10-2). The operating system includes various system programs, such as framework layers, kernel library layers, and driver layers used for implementing various services and processing hardware-based tasks. The application may include various application programs.

In some embodiments, a multimedia information processing apparatus provided in the embodiments of the present disclosure may be implemented in the form of a combination of software and hardware. In an example, the multimedia information processing apparatus provided in the embodiments of the present disclosure may be a processor in the form of a hardware decoding processor, and is programmed to perform the multimedia information processing method provided in the embodiments of the present disclosure. For example, the processor in the form of the hardware decoding processor may use one or more application specific integrated circuits (ASICs), digital signal processors (DSPs), programmable logic devices (PLDs), complex programmable logic devices (CPLDs), field-programmable gate arrays (FPGAs), or other electronic elements.

For example, the multimedia information processing apparatus provided in the embodiments of the present disclosure is implemented by a combination of software and hardware. The multimedia information processing apparatus provided in the embodiments of the present disclosure may be directly embodied as a combination of software modules executed by the processor 201. The software modules may be located in a storage medium, the storage medium is located in the memory 202, and the processor 201 reads executable instructions included in the software modules in the memory 202, and implements, in combination with suitable hardware (for example, including a processor 201 and another component connected to the bus system 205), the multimedia information processing method provided in the embodiments of the present disclosure.

As an example, the processor 201 may be an integrated circuit chip having a signal processing capability, for example, a general-purpose processor, a digital signal processor, or another programmable logic device, a discrete or transistor logic device, or a discrete hardware component, where the general-purpose processor may be a microprocessor, any suitable processor, or the like.

As an example in which the multimedia information processing apparatus provided in the embodiments of the present disclosure is implemented by hardware, the apparatus provided in the embodiments of the present disclosure may be directly executed by the processor 201 in the form of a hardware decoding processor, for example, executed by one or more ASICs, DSPs, PLDs, CPLDs, FPGAs or other electronic elements to implement the multimedia information processing method provided in the embodiments of the present disclosure.

The memory 202 in the embodiments of the present disclosure is configured to store data of various types to support operations of an electronic device 20. An example of the data includes: any executable instruction used for being operated on the electronic device 20, such as an executable instruction including a program for implementing the multimedia information processing method in the embodiments of the present disclosure.

In some other embodiments, the multimedia information processing apparatus provided in the embodiments of the present disclosure may be implemented in the form of software. FIG. 2 shows a multimedia information processing apparatus 2020 stored in the memory 202, which may be software in the form of a program, a plug-in, or the like, and include a series of modules. An example of the program stored in the memory 202 may include the multimedia information processing apparatus 2020. The multimedia information processing apparatus 2020 includes the following software modules: an information transmission module 2081, and an information processing module 2082. When or in response to determining that a software module in the multimedia information processing apparatus 2020 is read into a RAM by the processor 201 and executed, the multimedia information processing method provided in the embodiments of the present disclosure is performed.

According to the electronic device shown in FIG. 2, the embodiments of the present disclosure also provide a computer program product or computer program, including a computer instruction (executable instruction) stored in a computer-readable storage medium. A processor of the electronic device reads the computer instruction in the computer-readable storage medium. The processor executes the computer instruction to cause the electronic device to implement different embodiments and a combination of the embodiments provided in various optional implementations of the multimedia information processing method described above.

Figure 3:
FIG. 3 is a schematic diagram of excessive video cropping according to certain embodiment(s) of the present disclosure.

Before describing the multimedia information processing method provided in the present disclosure, defects of certain existing art are described first. Although an existing video server can roughly identify a similarity between videos through a corresponding matching algorithm, with the popularization and development of video editing tools, types of video image attacks have become more complex. FIG. 3 is a schematic diagram of excessive video cropping according to an embodiment of the present disclosure. In a cropped video shown in FIG. 3, it is difficult to identify, by simply relying on video image fingerprints, some video repeating/infringing content that have changed a lot on a screen. In addition, with the upgrade of video interactive gameplay, more and more video screens are based on the same fixed background, and only a smaller proportion of the screen is user-defined content, which results in an overall high similarity between two screens, but the actual contents are different, and both belong to the original content. In certain existing art, audio information in videos may be compared through an audio fingerprint algorithm, to determine whether the videos are similar. In certain embodiment(s), taking an audio fingerprint algorithm of landmark as an example, an audio is firstly Fourier transformed to generate an audio spectrogram; then, on the basis of the audio spectrogram, a corresponding constellation map is calculated according to a frequency peak point; and finally, the constellation map is processed to generate a combined hash landmark (t1, f1, f2, and t2-t1), where t1 and t2 represent two time points, f1 represents a maximum frequency value corresponding to a time point t1, and f2 represents a maximum frequency value at a corresponding time point t2. However, this process cannot implement identification for a use environment with a lot of attack information, for example: For a use environment of a voice-changing attack, because the landmark depends on a frequency peak point, and a frequency of an audio is changed in a voice-changing video, a generated hash is different, which eventually results in a failure of similarity identification (that is, it is incorrectly identified as dissimilar); and for a use environment of a speed-up/slow-speed attack, because a combined hash in the landmark depends on a dt(t2-t1), and a dt of a speed-up/slow-speed audio changes, a generated hash is different, which eventually results in a failure of similarity identification.

Figure 4:
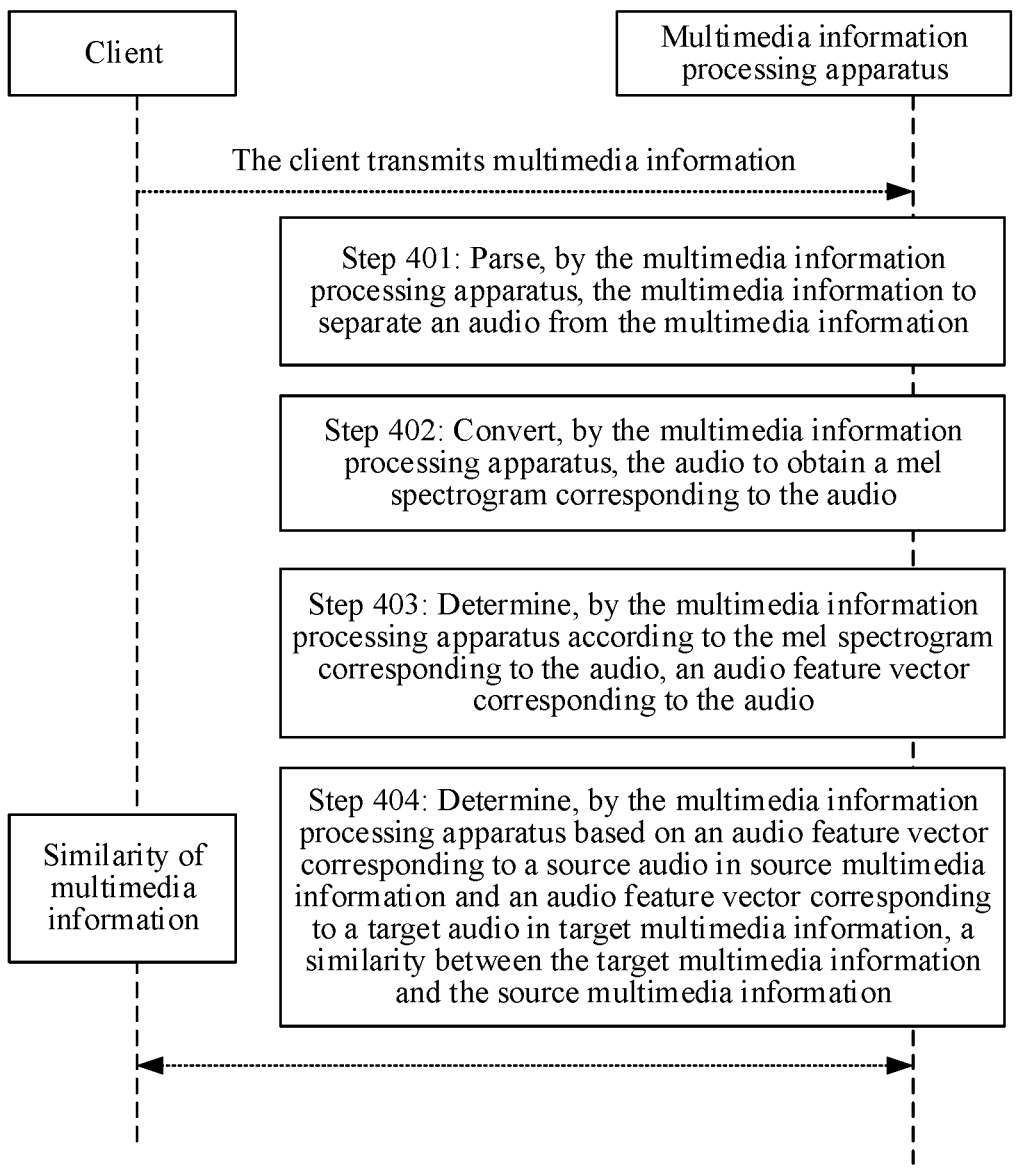
FIG. 4 is a schematic flowchart of a multimedia information processing method according to certain embodiment(s) of the present disclosure.

To overcome the defects described above, FIG. 4 is a schematic flowchart of a multimedia information processing method according to an embodiment of the present disclosure. It may be understood that steps shown in FIG. 4 may be performed by various electronic devices, such as a terminal, a server, or a server cluster with a multimedia information processing function, running the multimedia information processing apparatus. For example, when running in a terminal, the multimedia information processing apparatus may trigger a mini program in the terminal to perform similarity detection (similarity identification) of multimedia information; and when the multimedia information processing apparatus runs in a long video copyright detection server and a music playing software server, copyright detection may be performed on a corresponding long video or audio information. The following describes the steps shown in FIG. 4.

Step 401: Parse, by a multimedia information processing apparatus, multimedia information to separate an audio from the multimedia information.

The multimedia information is obtained, and the multimedia information is parsed to obtain the audio in the multimedia information.

In some embodiments of the present disclosure, the multimedia information is parsed to separate the audio from the multimedia information, which may be implemented in the following manners:

parsing the multimedia information to obtain timing information of the multimedia information; parsing, according to the timing information of the multimedia information, video parameters corresponding to the multimedia information, to obtain a playing duration parameter and an audio track information parameter that are corresponding to the multimedia information; and extracting the audio from the multimedia information based on the playing duration parameter and the audio track information parameter that are corresponding to the multimedia information.

For example, the multimedia information is a video, an audio synchronization packet in the video may be obtained first, and the audio synchronization packet is used for representing timing information. Then, audio header decoding data AACDecoderSpecificInfo and audio data configuration information AudioSpecificConfig in the audio synchronization packet are parsed to obtain a playing duration parameter and an audio track information parameter that are corresponding to the video. The audio data configuration information AudioSpecificConfig is used for generating ADST (including a sampling rate, a quantity of channels, and frame length data in an audio). Based on the audio track information parameter, other audio packets in the video are obtained, original audio data is parsed, and finally an AAC elementary stream (ES) is packaged into an ADTS format through an advanced audio coding (AAC) decoder of an audio data header. For example, a 7-byte header file ADTSheader may be added before the AAC ES to extract an audio from multimedia information (such as a video).

Step 402: Convert, by the multimedia information processing apparatus, the audio to obtain a mel spectrogram corresponding to the audio.

The conversion processing is performed on the audio, to convert the audio to a mel spectrogram. Because the unit of frequency is Hertz (Hz), a frequency range audible to a human ear is 20-20000 Hz, but it is not a linear relationship between the human ear perception and the scale unit of Hz. For example, when or in response to determining that a human is adapted to a pitch of 1000 Hz, and if a frequency of the pitch is increased to 2000 Hz, then the human ear can only perceive that the frequency has increased a little, but cannot perceive that the frequency has doubled. If the audio is converted to data in a mel spectrogram (that is, converting the frequency scale to a mel frequency scale), it is a linear relationship between the human ear perception and the frequency. That is, under the mel frequency scale, when or in response to determining that mel frequencies of two audios are twice different, pitches audible to the human ear are also about twice different. Therefore, the beneficial technical effects of improving the perception of an audio and visualizing the audio can be implemented.

In some embodiments of the present disclosure, the converting the audio to obtain a mel-spectrogram corresponding to the audio may be implemented in the following manners:

performing channel conversion processing on the audio to obtain mono audio data; performing STFT on the mono audio data based on a windowing function, to obtain a corresponding spectrogram; and processing the spectrogram according to a duration parameter, to obtain the mel spectrogram corresponding to the audio.

For example, the audio may first be resampled (that is, channel conversion processing) to 16 KHz mono audio data; then, a Hann time window of 25 ms is used, and with a frame shift of 10 ms, a periodic Hann window performs STFT on the mono audio data to obtain the corresponding spectrogram; a mel spectrum is calculated by mapping the spectrogram to a 64-order mel filter bank, where a range of mel bins is 125-7500 Hz; log(mel-spectrum+0.01) is calculated to obtain a stable mel spectrum, and an added bias of 0.01 is to avoid taking a logarithm of 0; and the obtained features are framed with a duration parameter of 0.96 s, in which there is no overlap of frames, and each frame includes 64 mel frequency bands with a duration of 10 ms (a total of 96 frames), so as to extract the mel spectrogram corresponding to the audio. The windowing function and the duration parameter may be considered as corresponding to the multimedia information processing model.

Step 403: Determine, by the multimedia information processing apparatus according to the mel spectrogram corresponding to the audio, an audio feature vector corresponding to the audio.

According to the mel spectrogram corresponding to the audio, the audio feature vector corresponding to the audio is determined, and the audio feature vector can effectively reflect characteristics of the audio.

In some embodiments of the present disclosure, the determining, according to the mel spectrogram corresponding to the audio, an audio feature vector corresponding to the audio may be implemented in the following manners:

determining corresponding input triplet samples based on the mel spectrogram; performing cross-processing on the input triplet samples through a convolutional layer and a max pooling layer of a multimedia information processing model, to obtain downsampling results of the different input triplet samples; normalizing the downsampling results through a fully connected layer of the multimedia information processing model, to obtain normalized results; and performing deep factorization processing on the normalized results through the multimedia information processing model, to obtain audio feature vectors matching the different input triplet samples.

Figure 5:
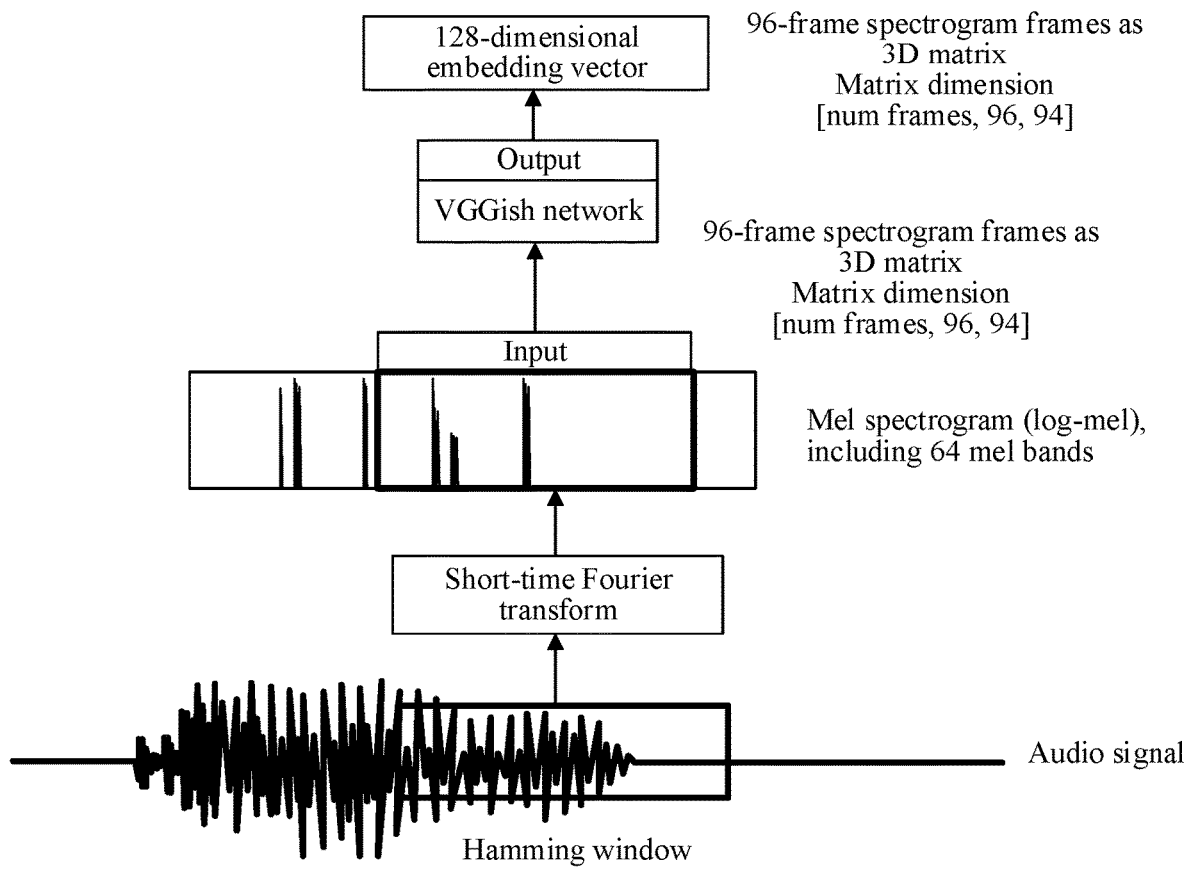
FIG. 5 is a schematic diagram of a processing process of a multimedia information processing model according to certain embodiment(s) of the present disclosure.

As an example, FIG. 5 is a schematic diagram of a processing process of a multimedia information processing model according to an embodiment of the present disclosure. The feature extraction of the multimedia information processing model may be implemented by a visual geometry group (VGGish) network. For example, audio features are extracted from a mel spectrogram through the Vggish network, and extracted vectors are clustered and encoded by net vector of locally aggregated descriptors (NetVLAD) to obtain audio feature vectors. The NetVLAD can save a distance between each feature point and a nearest cluster center and use the distance as a new feature.

The description is further made by taking the VGGish network as an example, the VGGish network supports the extraction of 128-dimensional embedding feature vectors with semantics, that is, the audio feature vectors, from a corresponding audio. In a process of feature extraction, an audio is first converted into an input triplet sample of a mel spectrogram as the input of the VGGish network. An example of the conversion process is as follows: the signal amplitude is used to calculate a spectrogram, the spectrogram is mapped to a 64-order mel filter bank to calculate a mel spectrogram, to obtain N input triplet samples mapped from Hz to the mel spectrogram, and a feature dimension is N*96*64. A Tensorflow-based VGGish network may be used as an audio feature extractor, that is, the input triplet sample is used as the input of the VGGish network, and the VGGish network is used for feature extraction to obtain N*128 audio feature vectors.

Step 404: Determine, by the multimedia information processing apparatus based on an audio feature vector corresponding to a source audio in source multimedia information and an audio feature vector corresponding to a target audio in target multimedia information, a similarity between the target multimedia information and the source multimedia information.

In this embodiment of the present disclosure, the similarity between two pieces of multimedia information may be determined according to the audio feature vector. To facilitate the distinction, the source multimedia information and the target multimedia information are respectively named, an audio in the source multimedia information is named as the source audio, and an audio in the target multimedia information is named as the target audio. Then, through the step 401 to the step 403, the audio feature vector corresponding to the source audio and the audio feature vector corresponding to the target audio may be determined.

Based on the audio feature vector corresponding to the source audio in the source multimedia information and the audio feature vector corresponding to the target audio in the target multimedia information, the similarity between the target multimedia information and the source multimedia information can be determined, that is, the similarity identification of multimedia information is implemented.

Figure 6:
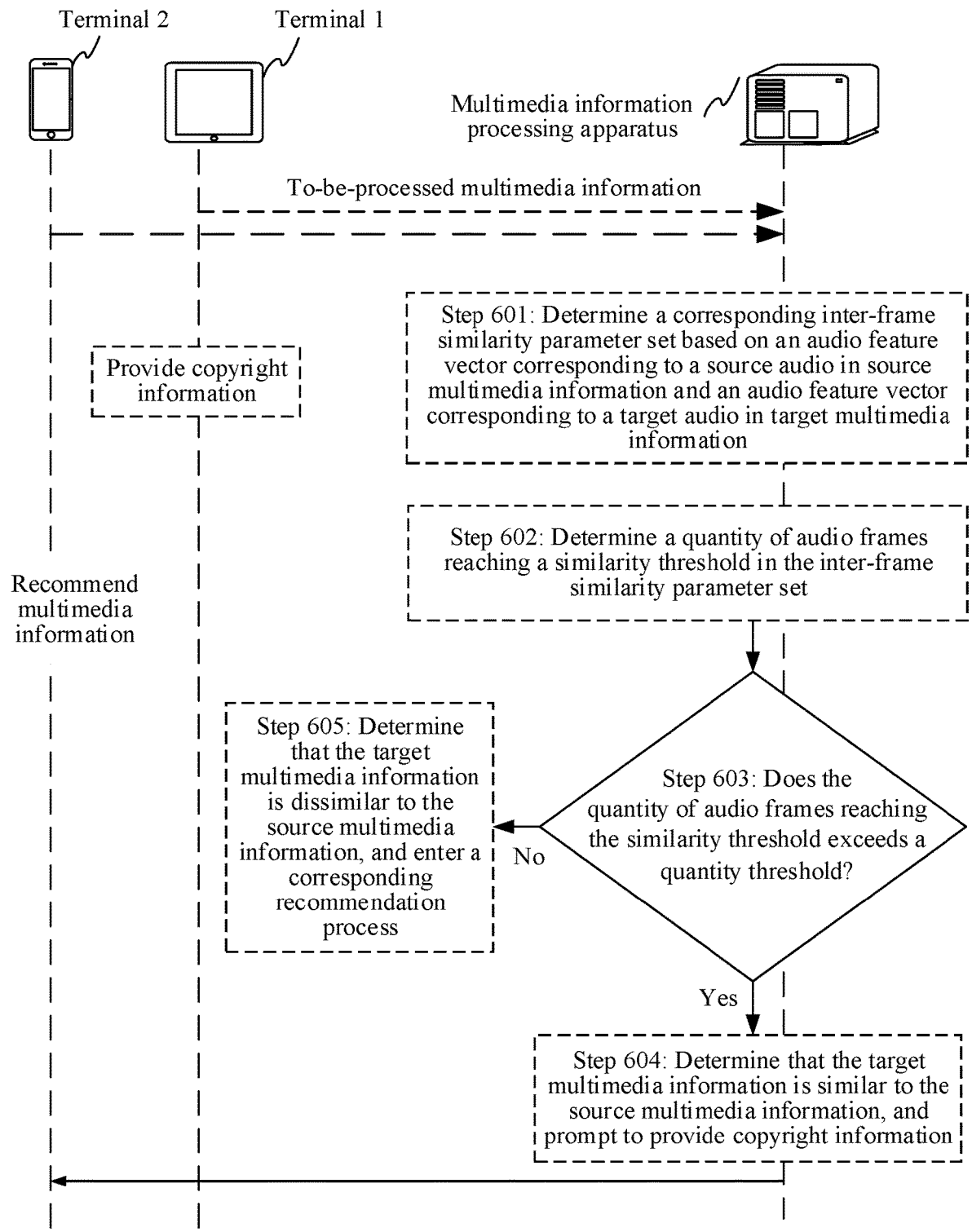
FIG. 6 is a schematic flowchart of similarity identification according to certain embodiment(s) of the present disclosure.

FIG. 6 is a schematic flowchart of similarity identification according to an embodiment of the present disclosure. It can be understood that steps shown in FIG. 6 can be performed by various electronic devices running the multimedia information processing apparatus, for example, a terminal, a server, or a server cluster with a multimedia information processing function. When running in the terminal, the multimedia information processing apparatus may trigger a mini program in the terminal to perform similarity identification of multimedia information; and when the multimedia information processing apparatus runs in a short video copyright detection server and a music playing software server, the copyright detection may be performed on a corresponding short video or an audio. The following describes the steps shown in FIG. 6.

Step 601: Determine a corresponding inter-frame similarity parameter set based on an audio feature vector corresponding to a source audio in source multimedia information and an audio feature vector corresponding to a target audio in target multimedia information.

For example, the source audio may be divided into a plurality of audio frames, and the target audio may be divided into a plurality of audio frames, where the source audio and the target audio may correspond to the same division standard (for example, a duration of each audio frame). Then, pairwise combination processing (such as exhaustive pairwise combination processing) is performed on the plurality of audio frames divided from the source audio and the plurality of audio frames divided from the target audio, to obtain a plurality of audio frame pairs, where each of the audio frame pairs includes one audio frame divided from the source audio and one audio frame divided from the target audio.

For each of the audio frame pairs, according to audio feature vectors respectively corresponding to two audio frames in the each of the audio frame pairs, an inter-frame similarity between the two audio frames is determined. Then, an inter-frame similarity parameter set is constructed according to all inter-frame similarities.

Step 602: Determine a quantity of audio frames in the inter-frame similarity parameter set reaching a similarity threshold.

In the inter-frame similarity parameter set, a quantity of audio frames (a quantity of audio frames may refer to a quantity of audio frame pairs) whose inter-frame similarities reach a similarity threshold is determined.

Step 603: Perform a step 604 when or in response to determining that the quantity of audio frames reaching the similarity threshold exceeds a quantity threshold; otherwise, perform a step 605.

The quantity of audio frames reaching the similarity threshold is compared with the quantity threshold. When or in response to determining that the quantity of audio frames reaching the similarity threshold exceeds the quantity threshold, it is determined that the target multimedia information is similar to the source multimedia information; and when or in response to determining that the quantity of audio frames reaching the similarity threshold does not exceed the quantity threshold, it is determined that the target multimedia information is dissimilar to the source multimedia information.

Step 604: Determine that the target multimedia information is similar to the source multimedia information, and prompt to provide copyright information.

When or in response to determining that the target multimedia information is similar to the source multimedia information, it is proved that there may be a risk of copyright infringement. Therefore, the copyright information, which may be copyright information of at least one of the target multimedia information and the source multimedia information, may be prompted to be provided.

Step 605: Determine that the target multimedia information is dissimilar to the source multimedia information, and enter a corresponding recommendation process.

When or in response to determining that the target multimedia information is dissimilar to the source multimedia information, it is proved that there is no risk of copyright infringement. Therefore, a corresponding recommendation process may be directly entered. The recommendation process may be used for recommending at least one of the target multimedia information and the source multimedia information.

In some embodiments of the present disclosure, in response to determining that the target multimedia information is similar to the source multimedia information, the copyright information of the target multimedia information and the copyright information of the source multimedia information are obtained; the legality of the target multimedia information is determined through the copyright information of the target multimedia information and the copyright information of the source multimedia information; and when or in response to determining that the copyright information of the target multimedia information is inconsistent with the copyright information of the source multimedia information, warning information is transmitted.

In response to determining that the target multimedia information is similar to the source multimedia information, it is proved that there may be a risk of copyright infringement. Therefore, the copyright information of the target multimedia information and the copyright information of the source multimedia information can be obtained, and the legality of the target multimedia information can be determined through the copyright information of the target multimedia information and the copyright information of the source multimedia information.

Taking the source multimedia information as legal by default as an example, when or in response to determining that the copyright information of the target multimedia information is consistent with the copyright information of the source multimedia information, it is determined that the target multimedia information is legal; and when or in response to determining that the copyright information of the target multimedia information is inconsistent with the copyright information of the source multimedia information, it is determined that the target multimedia information is illegal. In addition, when or in response to determining that the copyright information of the target multimedia information is inconsistent with the copyright information of the source multimedia information, warning information may also be transmitted.

In certain embodiment(s), in this embodiment of the present disclosure, the legality of the source multimedia information may also be determined on the premise that the target multimedia information is legal by default.

In some embodiments of the present disclosure, in response to determining that the target multimedia information is dissimilar to the source multimedia information, the target multimedia information is added to a multimedia information source; a recall order of to-be-recommended multimedia information in the multimedia information source is sorted; and based on a sorting result of the recall order of the to-be-recommended multimedia information, the multimedia information is recommended to a target user.

In response to determining that the target multimedia information is dissimilar to the source multimedia information, it is proved that there is no risk of copyright infringement. Therefore, the target multimedia information can be added to the multimedia information source as the to-be-recommended multimedia information in the multimedia information source. In certain embodiment(s), the source multimedia information may also be added to the multimedia information source. When or in response to determining that the multimedia information recommendation is to be performed, the recall order of the to-be-recommended multimedia information in the multimedia information source is sorted, and based on the sorting result of the recall order of the to-be-recommended multimedia information, the multimedia information is recommended to the target user.

Figure 7:
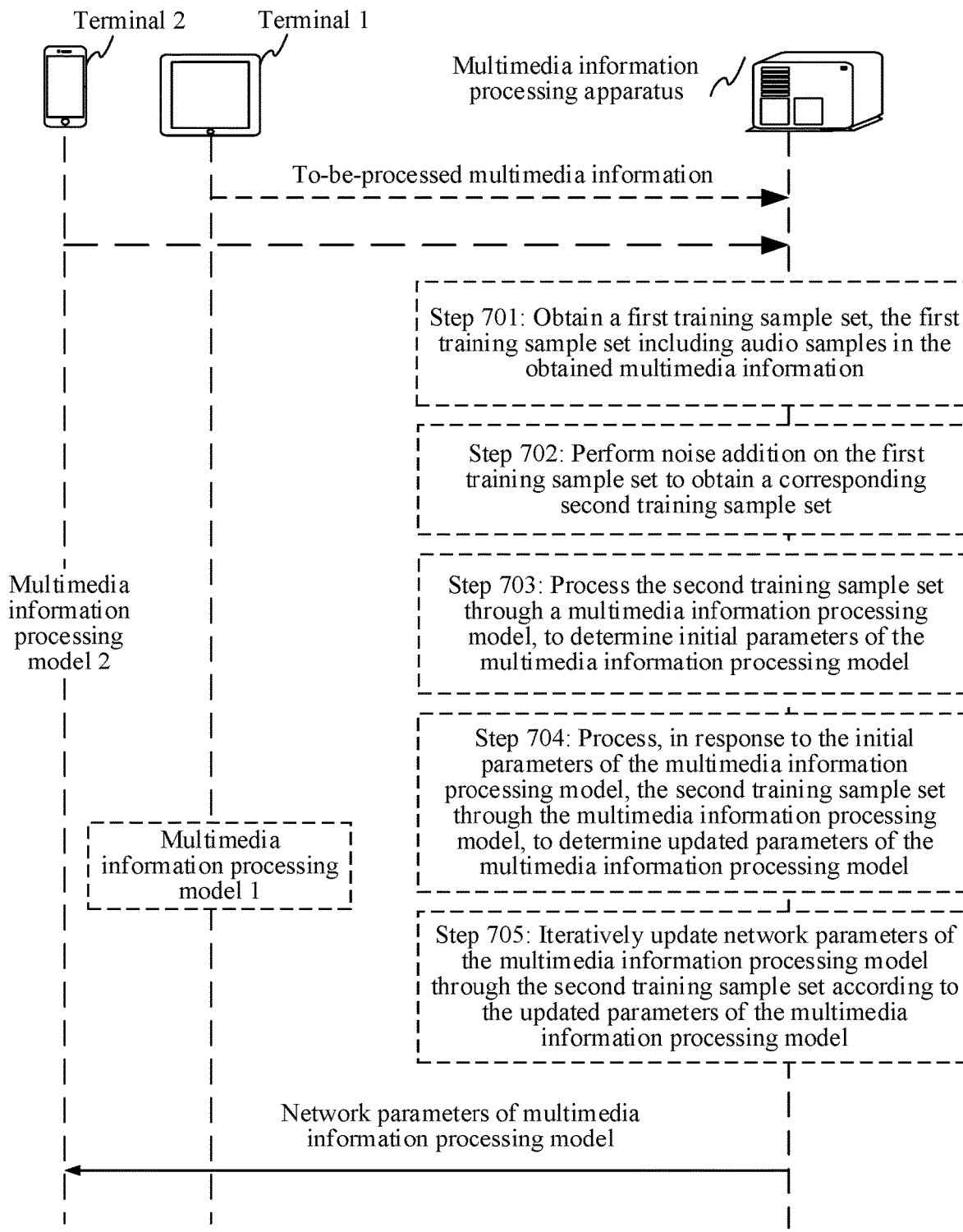
FIG. 7 is a schematic flowchart of training a multimedia information processing model according to certain embodiment(s) of the present disclosure.

FIG. 7 is a schematic flowchart of training a multimedia information processing model according to an embodiment of the present disclosure. It can be understood that steps shown in FIG. 7 may be performed by various electronic devices running the multimedia information processing apparatus, such as a terminal, a server, or a server cluster with a multimedia information processing function. Before deploying the multimedia information processing model, the multimedia information processing model may be trained, which is described with reference to the steps shown in FIG. 7.

Step 701: Obtain a first training sample set, the first training sample set including audio samples in the obtained multimedia information.

The first training sample set is obtained, the first training sample set including the audio samples in the obtained video information (for example, obtained by a terminal), and the first training sample set may include at least one audio sample.

Step 702: Perform noise addition on the first training sample set to obtain a corresponding second training sample set.

In some embodiments of the present disclosure, noise addition is performed on the first training sample set to obtain the corresponding second training sample set, which may be implemented in the following manners:

determining a dynamic noise type matching an environment in which the multimedia information processing model is used; and performing noise addition on the first training sample set according to the dynamic noise type, to change at least one of background noise, volume, sampling rate, and sound quality of the audio samples in the first training sample set, so as to obtain the corresponding second training sample set.

In this embodiment of the present disclosure, audio information attacks include but are not limited to: an attack by changing an audio frequency, and an attack by changing a speed of a video. Therefore, in a construction process of the second training sample set, an audio enhancement data set may be made according to an audio attack type, where an audio enhancement form (that is, dynamic noise type) includes but is not limited to: voice change, addition of background noise, volume change, sample rate change, sound quality change. Different enhanced audios may be obtained by setting different audio enhancement forms. In some embodiments of the present disclosure, the construction of the second training sample set does not use situations in which video duration changes or frame pairs are not neat due to a frame shift.

The second training sample set is made according to the audio enhancement data set. For example, one original audio corresponds to 20 attack audios in the audio enhancement data set. Durations of each of the attack audios and the original audio are the same and there is no frame shift (that is, an audio at a corresponding time point is the same), the audio duration is dur, and the step is 0.96 s, then each set of audios (original audio+corresponding attack audio) generates dur/0.96 labels, and labels at the same time point are the same. According to the attack audios and the corresponding labels, the second training sample set can be constructed.

Step 703: Process the second training sample set through a multimedia information processing model, to determine initial parameters of the multimedia information processing model.

Step 704: Process, in response to the initial parameters of the multimedia information processing model, the second training sample set through the multimedia information processing model, to determine updated parameters of the multimedia information processing model.

In some embodiments of the present disclosure, in response to the initial parameters of the multimedia information processing model, the second training sample set is processed through the multimedia information processing model, to determine the updated parameters of the multimedia information processing model, which may be implemented in the following manners:

substituting different audio samples in the second training sample set into a loss function corresponding to a triplet-loss layer network of the multimedia information processing model; determining parameters corresponding to the triplet-loss layer network when or in response to determining that the loss function satisfies a corresponding convergence condition; and determining the parameters of the triplet-loss layer network as the updated parameters of the multimedia information processing model.

Step 705: Update network parameters of the multimedia information processing model through the second training sample set according to the updated parameters of the multimedia information processing model. In certain embodiment(s), the update may be performed iteratively.

For example, the convergence condition matching the triplet-loss layer network in the multimedia information processing model may be determined; and the network parameters of the triplet-loss layer network are iteratively updated. In certain embodiment(s), the update continues to be peformed until the loss function corresponding to the triplet-loss layer network satisfies the corresponding convergence condition. Taking the multimedia information processing model including a VGGish network as an example, in a training phase, a 128-dimensional vector obtained by the VGGish network is inputted into a triplet-loss layer network (triplet-loss layer) in the multimedia information processing model for training, and finally similar audios obtain similar embedding outputs (that is, audio feature vectors). The formula of Triplet loss refers to Formula 1:

$$L=\max(d(a,p)-d(a,n)+\text{margin},0)$$  Formula 1, where

L represents a triplet loss function, a is a sample, p represents a sample similar to a, n represents a sample belonging to a category different from that of a (that is, dissimilar to a), d(a, p) is a distance between a and p in a vector space, and d(a, n) is the same. By minimizing the loss function described above, a degree of discrimination between similar and dissimilar samples can be learned.

Figure 8:
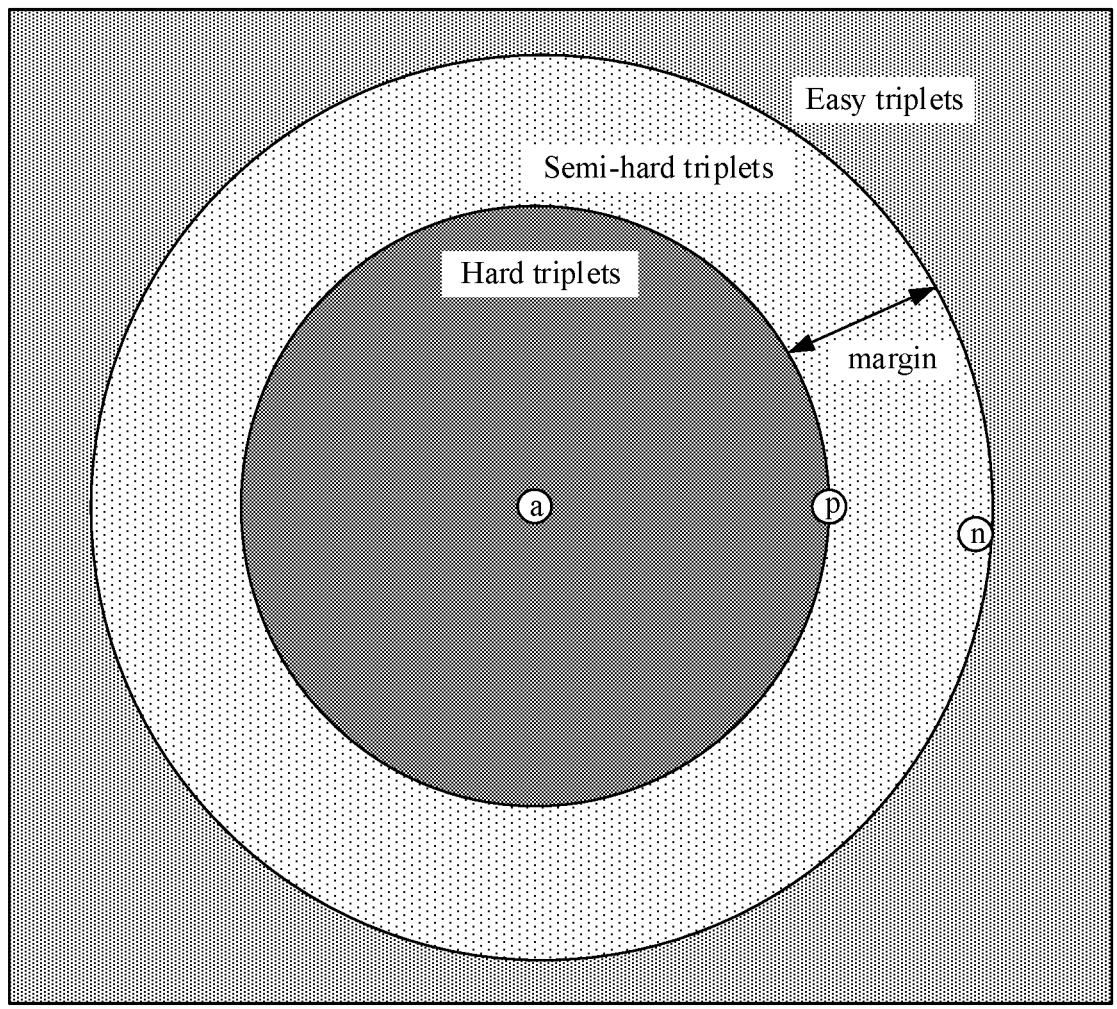
FIG. 8 is a schematic diagram of an effect of iterative processing according to certain embodiment(s) of the present disclosure.

A finalization goal of the iterative processing shown in FIG. 8 is to narrow the distance between a and p, and to widen a distance between a and n, which may include the following three scenarios:

1) Easy triplets: L=0, that is d(a, p)+margin< and d(a, n)d(a, p)+margin<d(a, n), no finalization is desirable in this scenario, that is, the distance between a and p is naturally close, and the distance between a and n is far away.

2) Hard triplets: d(a, n)< and d(a, p)d(a, n)<d(a, p), that is, the distance between a and p is far.

3) Semi-hard triplets: d(a, p)<; d(a, n)<; d(a, p)+margind(a, p) <; d(a, n) <; and d(a, p)+margind(a, p)<d(a, n)<d(a, p)+margin, that is, the distance between a and n is close, but there is a margin.

In implementation scenarios, considering an increasing quantity of multimedia information, related information of the multimedia information may be stored in a blockchain network or a cloud server, so as to determine the similarity of multimedia information.

In some embodiments of the present disclosure, an identifier of multimedia information, an audio feature vector corresponding to an audio in the multimedia information, and copyright information of the multimedia information may also be transmitted to the blockchain network, so that a node of the blockchain network fills the identifier of the multimedia information, the audio feature vector corresponding to the audio in the multimedia information, and the copyright information of the multimedia information into a new block, and when or in response to determining that a consensus on the new block is unanimous, the new block is appended to an end of a block chain.

In some embodiments, the following steps are further included:

receiving a data synchronization request from another node in the blockchain network; verifying a permission of the another node in response to the data synchronization request; and performing data synchronization between a current node and the another node when or in response to determining that the verification on the permission of the another node succeeds, so that the another node can obtain the identifier of the multimedia information, the audio feature vector corresponding to the audio in the multimedia information, and the copyright information of the multimedia information.

In some embodiments, the following steps are further included: parsing, in response to a query request, the query request to obtain a corresponding object identifier; obtaining permission information in a target block in the blockchain network according to the object identifier; verifying a matchability between the permission information and the object identifier; correspondingly obtaining, when or in response to determining that the permission information matches the object identifier, the identifier of the multimedia information, the audio feature vector corresponding to the audio in the multimedia information, and the copyright information of the multimedia information in the blockchain network; and transmitting the obtained identifier of the multimedia information, the audio feature vector corresponding to the audio in the multimedia information, and the copyright information of the multimedia information to a corresponding client, so that the client obtains the identifier of the multimedia information, the audio feature vector corresponding to the audio in the multimedia information, and the copyright information of the multimedia information.

Figure 9:
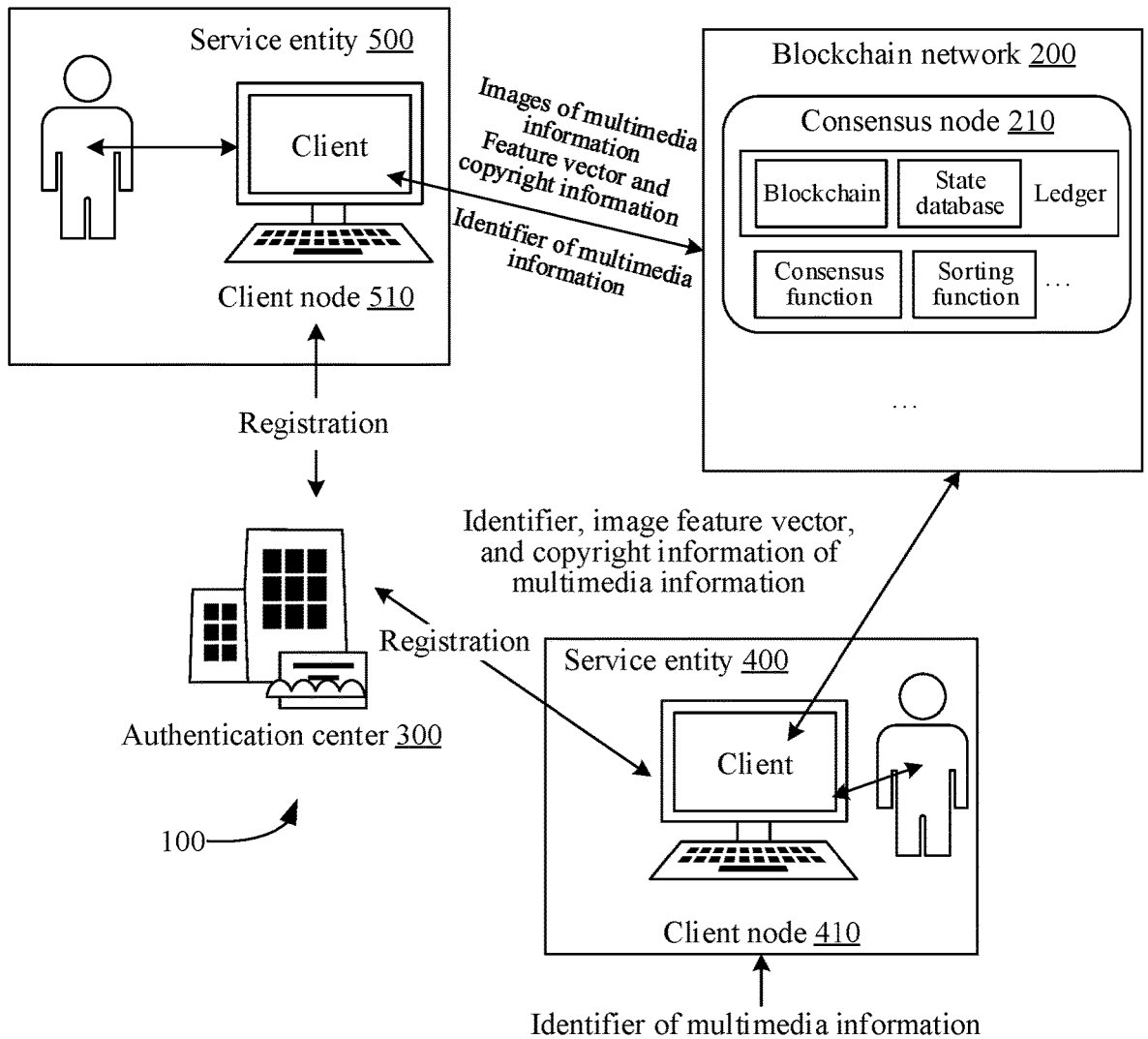
FIG. 9 is a schematic diagram of an architecture of a blockchain network according to certain embodiment(s) of the present disclosure.

FIG. 9 is a schematic diagram of an architecture of a blockchain network according to an embodiment of the present disclosure, including a blockchain network 200 (including a plurality of consensus nodes, where a consensus node 210 is exemplarily shown in FIG. 9), an authentication center 300, a service entity 400, and a service entity 500, which are respectively described below.

The type of the blockchain network 200 is flexible and diverse, such as any one of a public chain, a private chain, or a consortium chain. Taking the public chain as an example, an electronic device of any service entity, such as a user terminal and a server, may access the blockchain network 200 without authorization; and taking the consortium chain as an example, an electronic device (such as a terminal/server) under the jurisdiction of a service entity which has obtains authorization may access the blockchain network 200, and become a client node in the blockchain network 200 in this scenario.

In some embodiments, the client node may only serve as an observer of the blockchain network 200, that is, to provide a function of supporting a service entity to initiate a transaction (for example, for storing data on a chain or querying data on a chain), and the client node may implement the function, such as a sorting function, a consensus service, and a ledger function of the consensus nodes 210 of the blockchain network 200 by default or selectively (for example, depending on specific service desirables of the service entity). Therefore, data and a service processing logic of the service entity can be migrated to the blockchain network 200 to a greatest extent, and the data and the service processing process can be trustworthy and traceable through the blockchain network 200.

The consensus nodes in the blockchain network 200 receive a transaction submitted by client nodes (for example, a client node 410 belonging to a service entity 400 and a client node 510 belonging to a database operator system shown in an embodiment) from different service entities (for example, the service entity 400 and the service entity 500 shown in an implementation), execute the transaction to update a ledger or query the ledger, and execute various intermediate results or final results of the transaction, or the final results may be returned to the client nodes of the service entities for display.

For example, a client node 410/510 may subscribe to events of interest in the blockchain network 200, such as transactions occurring in a specific organization/channel in the blockchain network 200, and the consensus nodes 210 push corresponding transaction notifications to the client node 410/510, thereby triggering a corresponding service logic in the client node 410/510.

An exemplary implementation of the blockchain network is described by taking an example in which a plurality of service entities access the blockchain network to manage related information of multimedia information.

Referring to FIG. 9, a plurality of service entities involved in a management process, for example, the service entity 400 which may be a multimedia information processing apparatus and the service entity 500 which may be a display system with a multimedia information processing function, each register to obtain a respective digital certificate from the authentication center 300. The digital certificate includes a public key of the service entity, and a digital signature signed by the authentication center 300 on the public key and identity information of the service entity, which are used for attaching to a transaction together with a digital signature of the service entity for the transaction, and are transmitted to the blockchain network, for the blockchain network to take out the digital certificate and the signature from the transaction, and verify the reliability of a message (that is, whether it has not been tampered with) and the identity information of the service entity transmitting the message. The blockchain network verifies based on an identity, such as a permission to initiate a transaction. A client running on an electronic device (such as a terminal or server) under the jurisdiction of the service entity may request to access to the blockchain network 200 to become a client node.

The client node 410 of the service entity 400 is configured to transmit an identifier of multimedia information, an audio feature vector corresponding to an audio in the multimedia information, and copyright information of the multimedia information to the blockchain network, so that a node of the blockchain network fills the identifier of the multimedia information, the audio feature vector corresponding to the audio in the multimedia information, and the copyright information of the multimedia information into a new block, and when or in response to determining that a consensus on the new block is unanimous, the new block is appended to an end of a block chain.

The identifier of the multimedia information, the audio feature vector corresponding to the audio in the multimedia information, and the copyright information of the multimedia information are correspondingly transmitted to the blockchain network 200, and a service logic may be preset in the client node 410. For example, in response to determining that target multimedia information is dissimilar to source multimedia information, the client node 410 automatically transmits an identifier of the target multimedia information, an audio feature vector corresponding to an audio in the target multimedia information, and copyright information of the target multimedia information to the blockchain network 200, or a service personnel of the service entity 400 logs in in the client node 410, and manually packages and transmits the identifier of the target multimedia information, the audio feature vector corresponding to the audio in the target multimedia information, and the copyright information of the target multimedia information to the blockchain network 200. When transmitting, the client node 410 generates a transaction corresponding to an update operation according to the identifier of the multimedia information, the audio feature vector corresponding to the audio in the multimedia information, and the copyright information of the multimedia information, specifies, in the transaction, a smart contract that is to be called to implement the update operation, and parameters passed to the smart contract, where the transaction also carries a digital certificate of the client node 410, a signed digital signature (for example, obtained by encrypting a digest of the transaction using a private key in the digital certificate of the client node 410), and broadcasts the transaction to the consensus nodes 210 in the blockchain network 200.

When receiving the transaction, the consensus nodes 210 in the blockchain network 200 verify the digital certificate and the digital signature carried in the transaction, and after successful verification, confirm whether the service entity 400 has transaction authority according to an identity of the service entity 400 carried in the transaction, and any verification determining in the digital signature and the authority verification causes the transaction to fail. After successful verification, a digital signature of the consensus nodes 210 is signed (for example, obtained by encrypting a digest of the transaction using a private key of the consensus nodes 210), and the broadcasting continues to be performed in the blockchain network 200.

After receiving the successfully verified transaction, the consensus nodes 210 in the blockchain network 200 fill the transaction into a new block and broadcast the transaction. When broadcasting the new block, the consensus nodes 210 in the blockchain network 200 perform a consensus process on the new block, and when or in response to determining that the consensus is successful, append the new block to an end of a block chain stored thereof, update a state database according to a result of the transaction, and execute the transaction in the new block: For a submitted transaction in which the identifier of the multimedia information, the audio feature vector corresponding to the audio in the multimedia information, and the copyright information of the multimedia information are to be updated and processed, a key-value pair including the identifier of the multimedia information, the audio feature vector corresponding to the audio in the multimedia information, and the copyright information of the multimedia information is added to the state database.

A service personnel of the service entity 500 logs in in the client node 510, and inputs a query request for the identifier of the multimedia information, the audio feature vector corresponding to the audio in the multimedia information, and the copyright information of the multimedia information. The client node 510 generates a transaction corresponding to an update operation/query operation according to the query request, specifies, in the transaction, a smart contract that is to be called to implement the update operation/query operation and parameters passed to the smart contract, where the transaction also carries a digital certificate of the client node 510, a signed digital signature (for example, obtained by encrypting a digest of the transaction using a private key in the digital certificate of the client node 510), and broadcasts the transaction to the consensus nodes 210 in the blockchain network 200.

The consensus nodes 210 in the blockchain network 200 receive the transaction, verify the transaction, and fill a block, when or in response to determining that a consensus is unanimous, appends the filled new block to an end of a block chain stored thereof, update a state database according to a result of the transaction, and execute the transaction in the new block: For a submitted transaction in which copyright information of a specific piece of multimedia information is to be updated, a key-value pair corresponding to the copyright information of the multimedia information in the state database is updated; and for a submitted transaction in which copyright information of a specific piece of multimedia information is to be queried, an identifier of the multimedia information, an audio feature vector corresponding to an audio in the multimedia information, and a key-value pair corresponding to copyright information of the multimedia information are queried from the state database, and a transaction result is returned.

FIG. 9 exemplarily shows a process of directly uploading the identifier of the multimedia information, the audio feature vector corresponding to the audio in the multimedia information, and the copyright information of the multimedia information on a chain. However, in some other embodiments, when or in response to determining that the identifier of the multimedia information, the audio feature vector corresponding to the audio in the multimedia information, and the copyright information of the multimedia information occupy a relatively large amount of data, the client node 410 may upload the identifier of the multimedia information, the audio feature vector corresponding to the audio in the multimedia information, and a hash of the copyright information of the multimedia information on the chain in pairs, and simultaneously store the identifier of the multimedia information, the audio feature vector corresponding to the audio in the multimedia information, and the copyright information of the multimedia information in a distributed file system or a database. After obtaining the identifier of the multimedia information, the audio feature vector corresponding to the audio in the multimedia information, and the copyright information of the multimedia information from the distributed file system or database, the client node 510 may perform verification in combination with a corresponding hash in the blockchain network 200, thereby reducing the workload of an on-chain operation.

Figure 10:
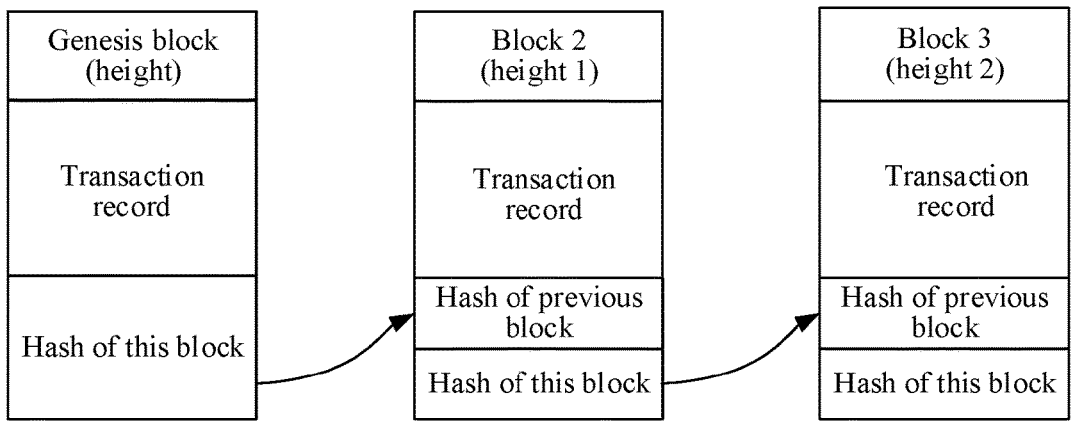
FIG. 10 is a schematic structural diagram of a block chain in a blockchain network according to certain embodiment(s) of the present disclosure.

As an example of a block chain, FIG. 10 is a schematic structural diagram of a block chain in a blockchain network 200 according to an embodiment of the present disclosure. A header of each block may include not only hash values of all transactions in the block, but also hash values of all transactions in a previous block. After being filled into the block and a consensus of nodes in the blockchain network is unanimous, a newly generated transaction record is appended to an end of the block chain to form a chain-like growth. A chain structure based on hash values between blocks ensures the tamper-proof and anti-forgery of a transaction in a block.

Figure 11:
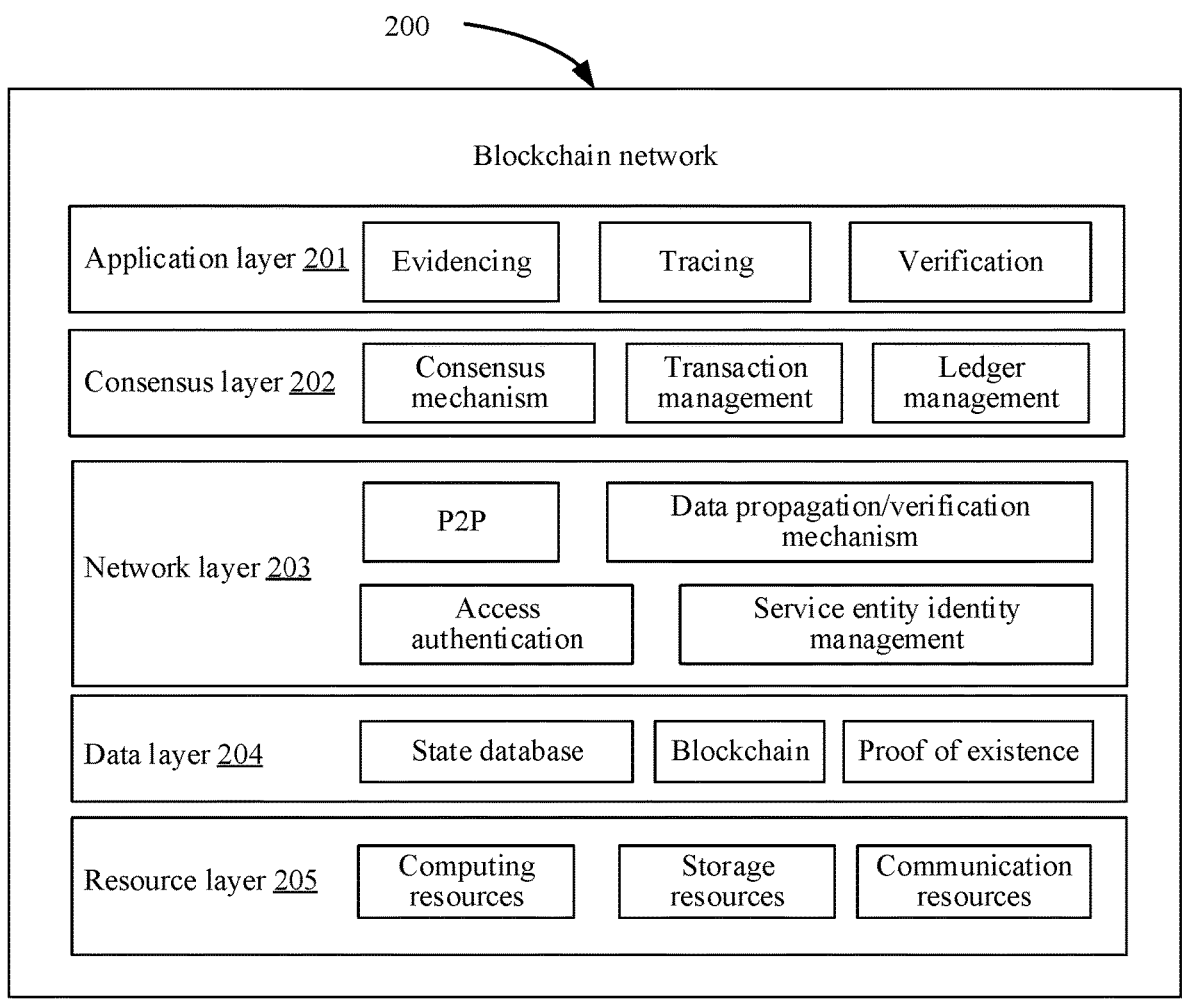
FIG. 11 is a schematic diagram of a functional architecture of a blockchain network according to certain embodiment(s) of the present disclosure.

An exemplary functional architecture of a blockchain network according to an embodiment of the present disclosure is described below. FIG. 11 is a schematic diagram of a functional architecture of a blockchain network 200 according to an embodiment of the present disclosure, including an application layer 201, a consensus layer 202, a network layer 203, a data layer 204, and a resource layer 205, which are respectively described below.

The resource layer 205 encapsulates computing resources, storage resources, and communication resources for implementing consensus nodes 210 in the blockchain network 200.

The data layer 204 encapsulates various data structures implementing a ledger, including a block chain implemented as a file in a file system, a key-value state database, and a proof of existence (for example, a hash tree of a transaction in a block).

The network layer 203 encapsulates functions of a point-to-point (P2P) network protocol, a data prorogation mechanism, a data verification mechanism, an access authentication mechanism, and service entity identity management.

The P2P network protocol implements the communication between the consensus nodes 210 in the blockchain network 200, the data propagation mechanism ensures the propagation of a transaction in the blockchain network 200, and the data verification mechanism is used for implementing the reliability of data transmission between the consensus nodes 210 based on a cryptographic method (such as a digital certificate, a digital signature, a public/private key pair); the access authentication mechanism is used for authenticating an identity of a service entity joining the blockchain network 200 according to actual service scenarios, and granting the service entity the authority to access the blockchain network 200 when or in response to determining that the authentication succeeds; and the service identity management is used for storing identities of service identities allowed to access the blockchain network 200, as well as permissions (for example, types of transactions that can be initiated).

The consensus layer 202 encapsulates a mechanism (for example, a consensus mechanism), and functions of transaction management and ledger management for the consensus nodes 210 in the blockchain network 200 to reach a consensus on a block. The consensus mechanism includes a consensus algorithm such as POS, POW, and DPOS, and supports the pluggability of the consensus algorithm.

The transaction management is used for verifying a digital signature carried in a transaction received by the consensus nodes 210, verifying identity information of a service entity, and determining whether the service identity has the authority to conduct the transaction according to the identity information (read relevant information from the service entity identity management); and service entities authorized to access the blockchain network 200 all have digital certificates issued by an authentication center, and the service entities use private keys in respective digital certificates to sign a submitted transaction, thereby declaring respective legal identities.

The ledger management is used for maintaining a block chain and a state database. A consensus block is appended to an end of a block chain; and a transaction in the consensus block is executed, a key-value pair in a state database is updated when or in response to determining that the transaction includes an update operation, the key-value pair in the state database is queried when or in response to determining that the transaction includes a query operation, and a query result is returned to a client node of a service entity. Query operations on various dimensions of a state database are supported, including: querying a block based on a block vector number (such as a transaction hash); querying a block according to a block hash value; querying a block according to a transaction vector number; querying a transaction according to a transaction vector number; querying account data of a service entity according to an account (vector number) of a service entity; and querying a block chain in a channel based on a channel name.

The application layer 201 encapsulates various services that the blockchain network can implement, including transaction traceability, evidencing, verification, and the like.

Therefore, copyright information of multimedia information that has gone through similarity identification can be stored in a blockchain network. When or in response to determining that a new user uploads multimedia information to a multimedia information server, the multimedia information server may call the copyright information in the blockchain network, to verify the copyright compliance of the multimedia information uploaded by the user.

Figure 12:
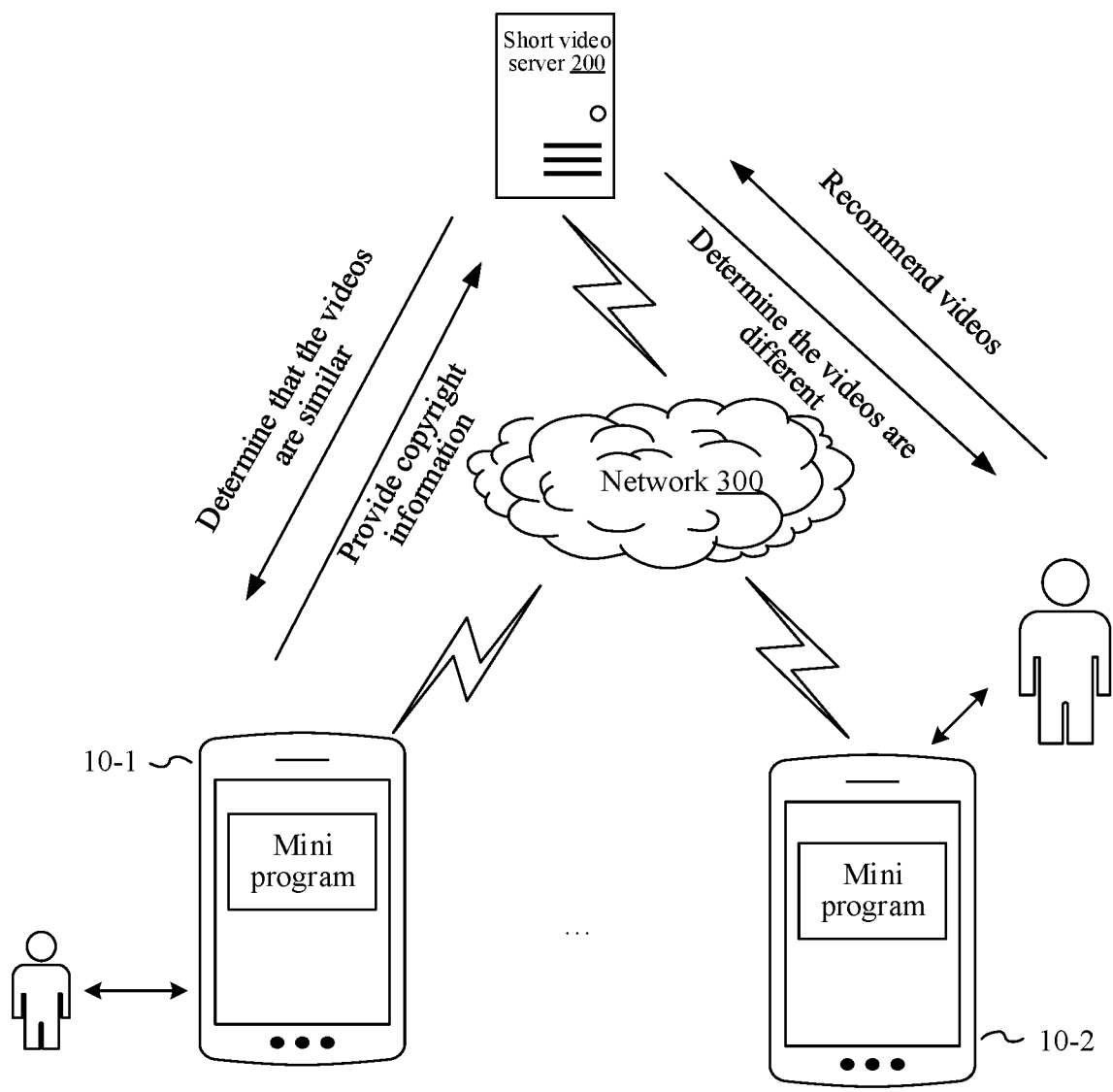
FIG. 12 is a schematic diagram of a use scenario of a multimedia information processing method according to certain embodiment(s) of the present disclosure.

FIG. 12 is a schematic diagram of a use scenario of a multimedia information processing method according to an embodiment of the present disclosure. Taking a scenario in which multimedia information is a short video as an example, a terminal (such as terminal 10-1 and terminal 10-2 shown in FIG. 1) is provided with a client capable of displaying a software corresponding to the short video, such as a client or a plug-in for short video playing, and a user may obtain and display the short video through the corresponding client; and the terminal is connected to a short video server 200 through a network 300, and the network 300 may be a wide area network or a local area network, or a combination of the two, and implements data transmission using a wireless link. In certain embodiment(s), the user may also upload the short video through a mini program in the terminal for other users in the network to watch. In this process, a video server of an operator desires to detect the short video uploaded by the user, compare and analyze different video information, for example, determine whether a copyright of the short video uploaded by the user is compliant, and recommend the compliant video to different users, so as to avoid the short video of the user from being pirated.

Figure 13:
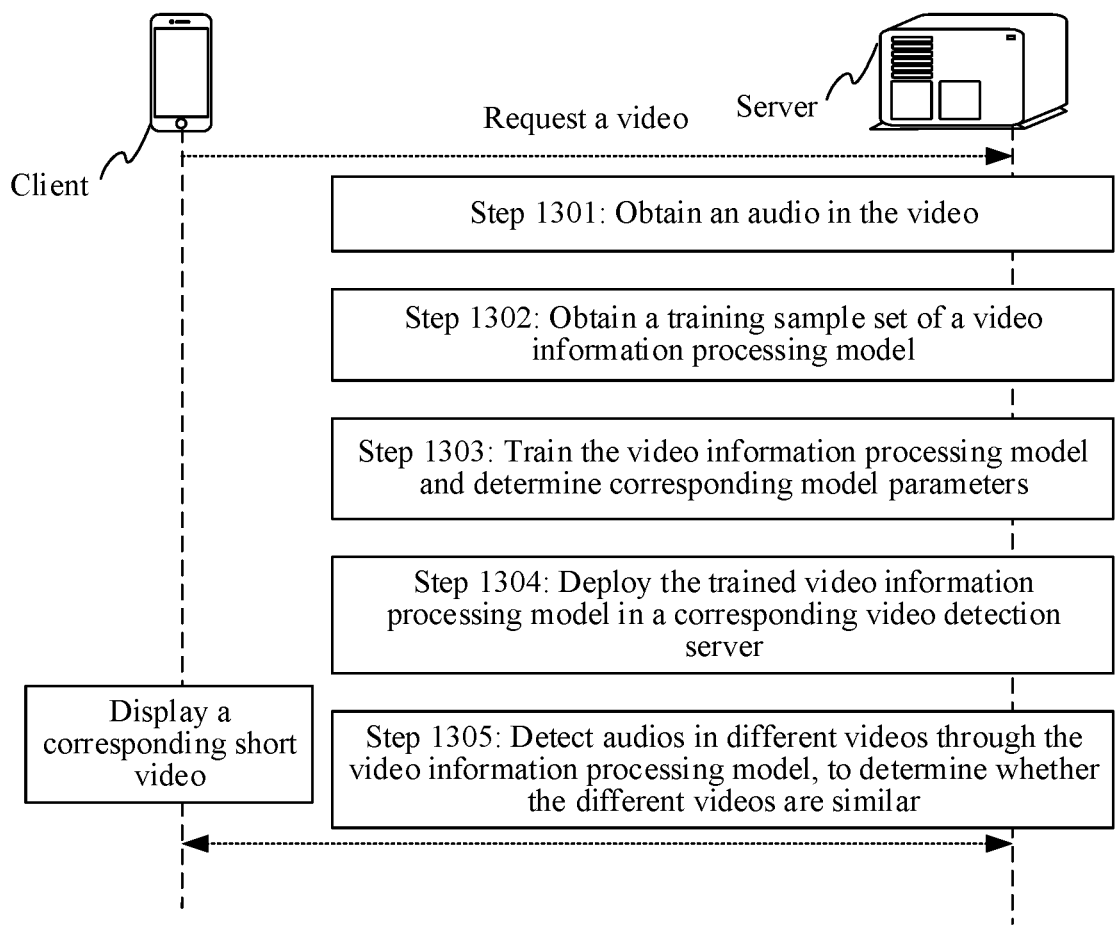
FIG. 13 is a schematic diagram of a process of using a multimedia information processing method according to certain embodiment(s) of the present disclosure.

A use process of the multimedia information processing method provided in the present disclosure is described below. FIG. 13 is a schematic diagram of a use process of a multimedia information processing method according to an embodiment of the present disclosure, and description is made with reference to steps shown in FIG. 13.

Step 1301: Obtain an audio in a video.

The obtained video may be parsed to separate the audio from the video, and the audio may also be preprocessed through a preprocessing process, such as determining a mel spectrogram corresponding to the audio.

Step 1302: Obtain a training sample set of a video information processing model (corresponding to the multimedia information processing model described above).

Step 1303: Train the video information processing model, and determine corresponding model parameters (network parameters).

The video information processing model is trained according to the training sample set (such as the second training sample set described above), and the corresponding model parameters are determined.

Step 1304: Deploy the trained video information processing model in a corresponding video detection server.

For the video detection server deployed with the trained video information processing model, relevant detection may be performed through the trained video information processing model.

Step 1305: Detect audios in different videos through the video information processing model, to determine whether the different videos are similar.

Taking a scenario in which videos are short videos as an example, in response to determining that a target short video is similar to a source video, copyright information of the target short video is determined, for example, corresponding copyright information uploaded by a user through a mini program run by a terminal 10-1 is obtained, or the copyright information is obtained according to a storage position of copyright information in a cloud server network. The legality of the target short video is determined through the copyright information of the target short video and copyright information of the source video. When or in response to determining that the copyright information of the target short video is inconsistent with the copyright information of the source video, warning information is transmitted.

In response to determining that the target short video is dissimilar to the source video, the target short video is added to a video source (corresponding to the multimedia information source described above) as a to-be-recommended video in the video source. A recall order of all to-be-recommended videos in the video source is sorted, and videos are recommended to a target user based on a sorting result of the recall order of the to-be-recommended videos, which is more conducive to the push of original videos.

An exemplary structure in which a multimedia information processing apparatus 2020 according to an embodiment of the present disclosure is implemented as a software module is further described below. In some embodiments, as shown in FIG. 2, the software module stored in the multimedia information processing apparatus 2020 of a memory 202 may include: an information transmission module 2081, configured to parse multimedia information to separate an audio from the multimedia information; and an information processing module 2082, configured to convert the audio to obtain a mel spectrogram corresponding to the audio; determine, according to the mel spectrogram corresponding to the audio, an audio feature vector corresponding to the audio; and determine, based on an audio feature vector corresponding to a source audio in source multimedia information and an audio feature vector corresponding to a target audio in target multimedia information, a similarity between the target multimedia information and the source multimedia information.

In some embodiments, the information transmission module 2081 is further configured to: parse the multimedia information to obtain timing information of the multimedia information; parse, according to the timing information of the multimedia information, video parameters corresponding to the multimedia information, to obtain a playing duration parameter and an audio track information parameter that are corresponding to the multimedia information; and extract the audio from the multimedia information based on the playing duration parameter and the audio track information parameter that are corresponding to the multimedia information.

In some embodiments, the information processing module 2082 is further configured to: perform channel conversion processing on the audio to obtain mono audio data; perform STFT on the mono audio data based on a windowing function, to obtain a corresponding spectrogram; and process the spectrogram according to a duration parameter, to obtain the mel spectrogram corresponding to the audio.

In some embodiments, the information processing module 2082 is further configured to: determine corresponding input triplet samples based on the mel spectrogram; perform cross-processing on the input triplet samples through a convolutional layer and a max pooling layer of a multimedia information processing model, to obtain downsampling results of the different input triplet samples; normalize the downsampling results through a fully connected layer of the multimedia information processing model, to obtain normalized results; and perform deep factorization processing on the normalized results through the multimedia information processing model, to obtain audio feature vectors matching the different input triplet samples.

In some embodiments, the information processing module 2082 is further configured to: obtain a first training sample set, the first training sample set including audio samples in acquired video information; perform noise addition on the first training sample set to obtain a corresponding second training sample set; process the second training sample set through a multimedia information processing model, to determine initial parameters of the multimedia information processing model; process, in response to the initial parameters of the multimedia information processing model, the second training sample set through the multimedia information processing model, to determine updated parameters of the multimedia information processing model; iteratively update network parameters of the multimedia information processing model through the second training sample set according to the updated parameters of the multimedia information processing model.

In some embodiments, the information processing module 2082 is further configured to: determine a dynamic noise type matching an environment in which the multimedia information processing model is used; and perform noise addition on the first training sample set according to the dynamic noise type, to change at least one of background noise, volume, sampling rate, and sound quality of the audio samples in the first training sample set, so as to obtain the corresponding second training sample set.

In some embodiments, the information processing module 2082 is further configured to: substitute different audio samples in the second training sample set into a loss function corresponding to a triplet-loss layer network of the multimedia information processing model; determine parameters corresponding to the triplet-loss layer network when or in response to determining that the loss function satisfies a corresponding convergence condition; and determine the parameters of the triplet-loss layer network as the updated parameters of the multimedia information processing model.

In some embodiments, the information processing module 2082 is further configured to: determine a convergence condition matching a triplet-loss layer network in the multimedia information processing model; and iteratively update network parameters of the triplet-loss layer network until a loss function corresponding to the triplet-loss layer network satisfies the convergence condition.

In some embodiments, the information processing module 2082 is further configured to: determine a corresponding inter-frame similarity parameter set based on the audio feature vector corresponding to the source audio in the source multimedia information and the audio feature vector corresponding to the target audio in the target multimedia information; determine a quantity of audio frames in the inter-frame similarity parameter set reaching a similarity threshold; and determine the similarity between the target multimedia information and the source multimedia information based on the quantity of audio frames reaching the similarity threshold.

In some embodiments, the information processing module 2082 is further configured to: obtain, in response to determining that the target multimedia information is similar to the source multimedia information, copyright information of the target multimedia information and copyright information of the source multimedia information; determine the legality of the target multimedia information through the copyright information of the target multimedia information and the copyright information of the source multimedia information; and transmit warning information when or in response to determining that the copyright information of the target multimedia information is inconsistent with the copyright information of the source multimedia information.

In some embodiments, the information processing module 2082 is further configured to: add, in response to determining that the target multimedia information is dissimilar to the source multimedia information, the target multimedia information to a multimedia information source; sort a recall order of to-be-recommended multimedia information in the multimedia information source; and recommend the multimedia information to a target user based on a sorting result of the recall order of the to-be-recommended multimedia information.

In some embodiments, the information processing module 2082 is further configured to: transmit an identifier of the multimedia information, an audio feature vector corresponding to an audio in the multimedia information, and copyright information of the multimedia information to a blockchain network, so that a node of the blockchain network fills the identifier of the multimedia information, the audio feature vector corresponding to the audio in the multimedia information, and the copyright information of the multimedia information into a new block, and when or in response to determining that a consensus on the new block is unanimous, the new block is appended to an end of a block chain.

In some embodiments, the information processing module 2082 is further configured to: receive a data synchronization request from another node in the blockchain network; verify a permission of the another node in response to the data synchronization request; and perform data synchronization between a current node and the another node when or in response to determining that the verification on the permission of the another node succeeds, so that the another node can obtain the identifier of the multimedia information, the audio feature vector corresponding to the audio in the multimedia information, and the copyright information of the multimedia information.

In some embodiments, the information processing module 2082 is further configured to: parse, in response to a query request, the query request to obtain a corresponding object identifier; obtain permission information in a target block in the blockchain network according to the object identifier; verify a matchability between the permission information and the object identifier; correspondingly obtain, when or in response to determining that the permission information matches the object identifier, the identifier of the multimedia information, the audio feature vector corresponding to the audio in the multimedia information, and the copyright information of the multimedia information in the blockchain network; and transmit the obtained identifier of the multimedia information, the audio feature vector corresponding to the audio in the multimedia information, and the copyright information of the multimedia information to a corresponding client, so that the client obtains the identifier of the multimedia information, the audio feature vector corresponding to the audio in the multimedia information, and the copyright information of the multimedia information.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The embodiments of the present disclosure have at least the following technical effects: In the embodiments of the present disclosure, by determining a mel spectrogram corresponding to an audio, and determining an audio feature vector corresponding to the f according to the mel spectrogram, a similarity between multimedia information can be effectively determined according to the audio feature vector, and the accuracy of determining the similarity between the multimedia information is improved. When or in response to determining that the multimedia information is a video, the misdetermining of a video similarity caused by excessive processing (such as excessive cropping) on a video image due to the determining solely relying on the video image is reduced.

The descriptions are merely exemplary embodiments of the present disclosure, but are not intended to limit the present disclosure. Any modification, equivalent replacement and improvement made within the spirit and principle of the present disclosure shall fall within the protection scope of the present disclosure.

What is claimed is:

1. A multimedia information processing method, performed by an electronic device, the method comprising:
   determining a first audio feature vector for source multimedia information;
   determining a second audio feature vector for target multimedia information;
   determining a similarity between the source multimedia information and the target multimedia information by comparing the first audio vector and the second audio vector;
   wherein an audio feature vector for multimedia information is determined by:
      parsing the multimedia information to separate an audio from the multimedia information;
      converting the audio to obtain a mel spectrogram corresponding to the audio;
      determining input triplet samples based on the mel spectrogram;
      performing cross-processing on the input triplet samples through a convolutional layer and a max pooling layer of a multimedia information processing model, to obtain downsampling results of the input triplet samples;
      normalizing the downsampling results through a fully connected layer of the multimedia information processing model, to obtain normalized results; and
      performing deep factorization processing on the normalized results through the multimedia information processing model, to obtain the audio feature vector matching the input triplet samples.

2. The method according to claim 1, wherein parsing the multimedia information comprises:
   parsing the multimedia information to obtain timing information of the multimedia information;
   parsing, according to the timing information of the multimedia information, video parameters corresponding to the multimedia information, to obtain a playing duration parameter and an audio track information parameter that are corresponding to the multimedia information; and extracting the audio from the multimedia information based on the playing duration parameter and the audio track information parameter that are corresponding to the multimedia information.

3. The method according to claim 1, wherein converting the audio comprises:
performing channel conversion processing on the audio to obtain mono audio data;
performing short-time Fourier transform (STFT) on the mono audio data based on a windowing function, to obtain a corresponding spectrogram; and
processing the spectrogram according to a duration parameter, to obtain the mel spectrogram corresponding to the audio.

4. The method according to claim 1, further comprising:
obtaining a first training sample set, the first training sample set comprising audio samples in acquired video information;
performing noise addition on the first training sample set, to obtain a corresponding second training sample set;
processing the second training sample set through the multimedia information processing model, to determine initial parameters of the multimedia information processing model;
processing, in response to the initial parameters of the multimedia information processing model, the second training sample set through the multimedia information processing model, to determine updated parameters of the multimedia information processing model; and
updating, according to the updated parameters of the multimedia information processing model, network parameters of the multimedia information processing model through the second training sample set.

5. The method according to claim 4, wherein performing the noise addition comprises:
determining a dynamic noise type matching a use environment of the multimedia information processing model; and
performing noise addition on the first training sample set according to the dynamic noise type, to change at least one of background noise, volume, sampling rate, and sound quality of audio samples in the first training sample set, so as to obtain the corresponding second training sample set.

6. The method according to claim 4, wherein processing the second training sample set comprises:
substituting different audio samples in the second training sample set into a loss function corresponding to a triplet-loss layer network of the multimedia information processing model;
determining parameters corresponding to the triplet-loss layer network in response to determining that the loss function satisfies a corresponding convergence condition; and
determining the parameters of the triplet-loss layer network as the updated parameters of the multimedia information processing model.

7. The method according to claim 4, wherein updating the network parameters comprises:
determining a convergence condition matching a triplet-loss layer network in the multimedia information processing model; and
updating network parameters of the triplet-loss layer network.

8. The method according to claim 1, wherein determining the similarity comprises:
determining a corresponding inter-frame similarity parameter set based on the audio feature vector corresponding to the source audio in the source multimedia information and the audio feature vector corresponding to the target audio in the target multimedia information;
determining a quantity of audio frames reaching a similarity threshold in the inter-frame similarity parameter set; and
determining the similarity between the target multimedia information and the source multimedia information based on the quantity of audio frames reaching the similarity threshold.

9. The method according to claim 1, further comprising:
obtaining, in response to determining that the target multimedia information is similar to the source multimedia information, copyright information of the target multimedia information and copyright information of the source multimedia information;
determining legality of the target multimedia information according to the copyright information of the target multimedia information and the copyright information of the source multimedia information; and
transmitting warning information in response to determining that the copyright information of the target multimedia information is inconsistent with the copyright information of the source multimedia information.

10. The method according to claim 1, further comprising:
adding, in response to determining that the target multimedia information is dissimilar to the source multimedia information, the target multimedia information to a multimedia information source;
sorting a recall order of to-be-recommended multimedia information in the multimedia information source; and
recommending multimedia information to a target user based on a sorting result of the recall order of the to-be-recommended multimedia information.

11. The method according to claim 1, further comprising:
transmitting an identifier of the multimedia information, an audio feature vector corresponding to an audio in the multimedia information, and copyright information of the multimedia information to a blockchain network, so that
a node of the blockchain network fills the identifier of the multimedia information, the audio feature vector corresponding to the audio in the multimedia information, and the copyright information of the multimedia information into a new block, and appends the new block to an end of a block chain in response to determining that a consensus on the new block is unanimous.

12. The method according to claim 11, further comprising:
receiving a data synchronization request of another node in the blockchain network;
performing verification on a permission of the another node in response to the data synchronization request; and
controlling, in response to determining that the verification on the permission of the another node succeeds, a current node to perform data synchronization with the another node, so that the another node obtains the identifier of the multimedia information, the audio feature vector corresponding to the audio in the multimedia information, and the copyright information of the multimedia information.

13. The method according to claim 11, further comprising:
  parsing, in response to a query request, the query request to obtain a corresponding object identifier;
  obtaining permission information in a target block in the blockchain network according to the object identifier;
  verifying a matchability between the permission information and the object identifier;
  correspondingly obtaining, in response to determining that the permission information matches the object identifier, the identifier of the multimedia information, the audio feature vector corresponding to the audio in the multimedia information, and the copyright information of the multimedia information in the blockchain network; and
  transmitting the obtained identifier of the multimedia information, the audio feature vector corresponding to the audio in the multimedia information, and the copyright information of the multimedia information to a corresponding client, so that the client obtains the identifier of the multimedia information, the audio feature vector corresponding to the audio in the multimedia information, and the copyright information of the multimedia information.

14. A multimedia information processing apparatus, comprising: a memory storing computer program instructions; and a processor coupled to the memory and configured to execute the computer program instructions and perform:
  determining a first audio feature vector for source multimedia information;
  determining a second audio feature vector for target multimedia information;
  determining a similarity between the source multimedia information and the target multimedia information by comparing the first audio vector and the second audio vector;
  wherein an audio feature vector for multimedia information is determined by:
    parsing the multimedia information to separate an audio from the multimedia information;
    converting the audio to obtain a mel spectrogram corresponding to the audio;
    determining input triplet samples based on the mel spectrogram;
    performing cross-processing on the input triplet samples through a convolutional layer and a max pooling layer of a multimedia information processing model, to obtain downsampling results of the input triplet samples;
    normalizing the downsampling results through a fully connected layer of the multimedia information processing model, to obtain normalized results; and
    performing deep factorization processing on the normalized results through the multimedia information processing model, to obtain the audio feature vector matching the input triplet samples.

15. The multimedia information processing apparatus according to claim 14, wherein parsing the multimedia information includes:
  parsing the multimedia information to obtain timing information of the multimedia information;
  parsing, according to the timing information of the multimedia information, video parameters corresponding to the multimedia information, to obtain a playing duration parameter and an audio track information parameter that are corresponding to the multimedia information; and
  extracting the audio from the multimedia information based on the playing duration parameter and the audio track information parameter that are corresponding to the multimedia information.

16. The multimedia information processing apparatus according to claim 14, wherein converting the audio includes:
  performing channel conversion processing on the audio to obtain mono audio data;
  performing short-time Fourier transform (STFT) on the mono audio data based on a windowing function, to obtain a corresponding spectrogram; and
  processing the spectrogram according to a duration parameter, to obtain the mel spectrogram corresponding to the audio.

17. The multimedia information processing apparatus according to claim 14, wherein the processor is further configured to execute the computer program instructions and perform:
  obtaining a first training sample set, the first training sample set comprising audio samples in acquired video information;
  performing noise addition on the first training sample set, to obtain a corresponding second training sample set;
  processing the second training sample set through the multimedia information processing model, to determine initial parameters of the multimedia information processing model;
  processing, in response to the initial parameters of the multimedia information processing model, the second training sample set through the multimedia information processing model, to determine updated parameters of the multimedia information processing model; and
  updating, according to the updated parameters of the multimedia information processing model, network parameters of the multimedia information processing model through the second training sample set.

18. A non-transitory computer-readable storage medium storing computer program instructions executable by at least one processor to perform:
  determining a first audio feature vector for source multimedia information;
  determining a second audio feature vector for target multimedia information;
  determining a similarity between the source multimedia information and the target multimedia information by comparing the first audio vector and the second audio vector;
  wherein an audio feature vector for multimedia information is determined by:
    parsing the multimedia information to separate an audio from the multimedia information;
    converting the audio to obtain a mel spectrogram corresponding to the audio;
    determining input triplet samples based on the mel spectrogram;
    performing cross-processing on the input triplet samples through a convolutional layer and a max pooling layer of a multimedia information processing model, to obtain downsampling results of the input triplet samples;
    normalizing the downsampling results through a fully connected layer of the multimedia information processing model, to obtain normalized results; and
    performing deep factorization processing on the normalized results through the multimedia information processing model, to obtain the audio feature vector matching the input triplet samples.

\* \* \* \* \*